US010394032B2

(12) United States Patent
Singer et al.

(10) Patent No.: US 10,394,032 B2
(45) Date of Patent: Aug. 27, 2019

(54) OPTICAL SYSTEM AND METHOD FOR TRANSMITTING A SOURCE IMAGE

(71) Applicant: Carl Zeiss AG, Oberkochen (DE)

(72) Inventors: Wolfgang Singer, Aalen (DE); Bernd Kleemann, Aalen (DE); Artur Degen, Jena (DE)

(73) Assignee: Carl Zeiss AG, Oberkochen (DE)

( * ) Notice: Subject to any disclaimer, the term of this patent is extended or adjusted under 35 U.S.C. 154(b) by 0 days.

(21) Appl. No.: 16/247,911

(22) Filed: Jan. 15, 2019

(65) Prior Publication Data

US 2019/0155034 A1 May 23, 2019

Related U.S. Application Data

(63) Continuation of application No. 16/008,394, filed on Jun. 14, 2018, now Pat. No. 10,191,288, which is a continuation of application No. PCT/EP2016/080902, filed on Dec. 14, 2016.

(30) Foreign Application Priority Data

Dec. 17, 2015 (DE) .................... 10 2015 122 055 U

(51) Int. Cl.
G02B 6/26 (2006.01)
G02B 27/01 (2006.01)
F21V 8/00 (2006.01)
G02B 5/18 (2006.01)

(52) U.S. Cl.
CPC ....... *G02B 27/0172* (2013.01); *G02B 5/1819* (2013.01); *G02B 6/005* (2013.01); *G02B 6/0026* (2013.01); *G02B 6/0076* (2013.01);

*G02B 2027/011* (2013.01); *G02B 2027/0112* (2013.01); *G02B 2027/0116* (2013.01);
(Continued)

(58) Field of Classification Search
CPC .... G02B 6/0006; G02B 6/005; G02B 6/0076; G02B 27/0125; G02B 27/0178
USPC .......................................... 385/37
See application file for complete search history.

(56) References Cited

U.S. PATENT DOCUMENTS 5,369,718 A * 11/1994 Kamata ................ G02F 1/3137
385/18
5,452,385 A 9/1995 Izumi
(Continued)

OTHER PUBLICATIONS

Translation of International Search Report for corresponding Appl No. PCT/EP2016/080902, dated Apr. 6, 2017.
(Continued)

*Primary Examiner* — Akm E Ullah
(74) *Attorney, Agent, or Firm* — Fish & Richardson P.C.

(57) ABSTRACT

An optical system for transmitting a source image is provided. Light having a field angle spectrum emanates from the source image. The optical system includes an optical waveguide arrangement, in which light can propagate by total internal reflection. The optical system also includes a diffractive optical input coupling arrangement for coupling the light emanating from the source image into the optical waveguide arrangement. The optical system further includes a diffractive optical output coupling arrangement for coupling the light that has propagated in the optical waveguide arrangement out from the optical waveguide arrangement. The disclosure also provides related methods.

20 Claims, 20 Drawing Sheets

(52) U.S. Cl.
CPC ............... *G02B 2027/0125* (2013.01); *G02B 2027/0178* (2013.01)

(56) References Cited

U.S. PATENT DOCUMENTS

| | | | |
|---|---|---|---|
| 5,812,714 A * | 9/1998 | Hulse | G02B 6/4298 |
| | | | 385/146 |
| 6,222,956 B1 | 4/2001 | Akiba | |
| 6,243,516 B1 | 6/2001 | Seino | |
| 6,270,244 B1 | 8/2001 | Naum | |
| 6,473,209 B1 | 10/2002 | Popovich | |
| 8,152,339 B2 * | 4/2012 | Morgan | F21S 11/00 |
| | | | 362/336 |
| 8,233,204 B1 | 7/2012 | Robbins et al. | |
| 8,903,207 B1 | 12/2014 | Brown et al. | |
| 10,191,288 B2 | 1/2019 | Singer et al. | |
| 2002/0097496 A1 | 7/2002 | Lu | |
| 2006/0221448 A1 | 10/2006 | Nivon et al. | |
| 2006/0228073 A1* | 10/2006 | Mukawa | G02B 6/0033 |
| | | | 385/31 |
| 2009/0128902 A1 | 5/2009 | Niv | |
| 2012/0127577 A1 | 5/2012 | Desserouer | |
| 2012/0140352 A1* | 6/2012 | Morgan | H01L 31/0525 |
| | | | 359/853 |
| 2014/0140653 A1 | 5/2014 | Brown et al. | |
| 2014/0218801 A1 | 8/2014 | Simmonds et al. | |
| 2016/0231568 A1 | 8/2016 | Saarikko | |
| 2017/0276940 A1 | 9/2017 | Popovich | |
| 2018/0188542 A1 | 7/2018 | Waldern | |
| 2018/0299678 A1 | 10/2018 | Singer et al. | |

OTHER PUBLICATIONS

Tapani Levola: "Diffractive optics for virtual reality displays", Journal of the SID 14/5, 2006, pp. 467 to 475 (9 pages).

German Office Action with translation thereof, for corresponding Appl No. 10 2015 122 055.5, dated Aug. 18, 2016.

German Office Action, with translation thereof, for corresponding Appl No. 10 2015 122 055.5, dated Nov. 28, 2017.

Translation of International Preliminary Report on Patentability for corresponding Appl No. PCT/EP2016/080902, dated Jun. 19, 2018.

\* cited by examiner

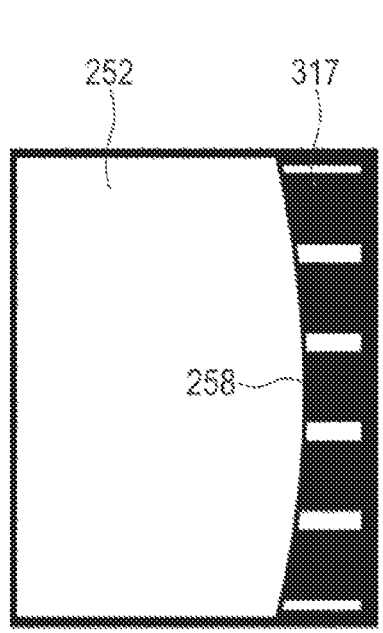
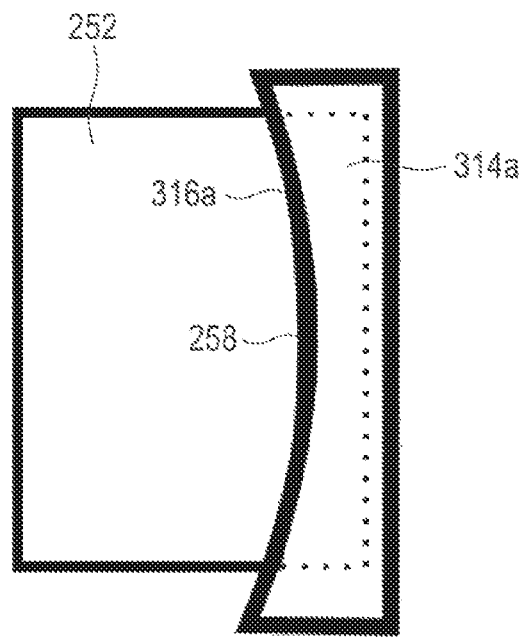
Fig. 23A　　　　Fig. 23B
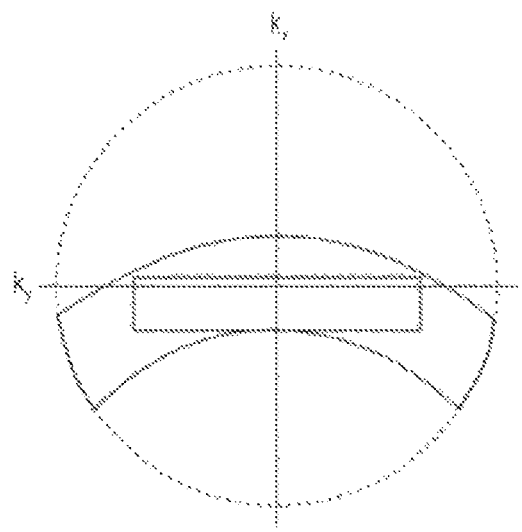
Fig. 24

OPTICAL SYSTEM AND METHOD FOR TRANSMITTING A SOURCE IMAGE

CROSS-REFERENCE TO RELATED APPLICATIONS

The present application is a continuation of, and claims benefit under 35 USC 120 to, U.S. application Ser. No. 16/008,394, filed Jun. 14, 2018, now U.S. Pat. No. 10,191,288, which is a continuation of, and claims benefit under 35 USC 120 to, international application PCT/EP2016/080902, filed Dec. 14, 2016, which claims benefit under 35 USC 119 of German Application No. 10 2015 122 055.5, filed Dec. 17, 2015. The entire disclosure of these applications are incorporated by reference herein.

FIELD

The disclosure relates to an optical system and method for transmitting a source image.

BACKGROUND

An optical system and a method for transmitting a source image are disclosed in the article by Tapani Levola: "Diffractive optics for virtual reality displays", Journal of the SID 14/5, 2006, pages 467 to 475. Further optical systems and methods for transmitting a source image are known from US 2014/0140653 A1, U.S. Pat. No. 8,233,204 B1, US 2014/0218801 A1, which disclose an optical system according to the preamble of patent claim 1. A further optical system for transmitting a source image is known from US 2006/0221448 A1.

An optical system of this type and a method of this type are used for example in a display system, such as an HUD (head-up display) or HMD (head-mounted display). An HUD and an HMD are display systems in which a source image is projected into the user's field of view with magnification of the exit pupil. In this case, the source image can be for example the image of a display of a vehicle instrument, of a cellular phone, of a games console, of a computer and the like. HUDs are used nowadays for example in aircraft and motor vehicles in order to project information, for example navigation information and the like, for the pilot or driver into the latter's field of view, without the pilot or driver having to divert his/her viewing direction from the straight-ahead viewing direction. An HMD, in contrast to an HUD, is worn on the user's head. An HMD either presents images on a screen close to the eyes, or projects the images directly onto the retina. Other designations for an HMD include video glasses or smartglasses, helmet display or virtual reality helmet.

The principal components of such display systems are a display unit, which supplies the source image from a connected data source, and an optical system for transmitting the source image into a target image.

One important characteristic variable of such display systems is the field of view (FOV). The field of view of such display systems desirably has a magnitude such that the entire source image is transmitted into the target image. The field of view is the difference between the maximum and minimum angles, in each case measured from the center of the image to the mutually opposite image edges in a horizontal dimension (horizontal field of view) and in a vertical dimension (vertical field of view). In the present description, reference is made only to the field of view in one dimension.

The optical system of such display systems, as is disclosed in the article cited above, have as component parts an optical waveguide arrangement having one or more optical waveguides, in which optical waveguide arrangement light can propagate by total internal reflection at optical interfaces, a diffractive optical input coupling arrangement, by which the light emanating from the source image can be coupled into the optical waveguide arrangement, and a diffractive optical output coupling arrangement, by which the light that has propagated in the optical waveguide arrangement can be coupled out from the optical waveguide arrangement, such that the light can enter one or both of the user's eyes. In this case, the optical waveguide arrangement can have one or more optical waveguides, and the input coupling arrangement and the output coupling arrangement can have one or more diffraction gratings.

In general, in the case of optical systems having the construction described above, it has been found that the field of view of such an optical system is restricted, that is to say that the entire source image or, in other words, the entire field angle spectrum of the light emanating from the source image cannot be transmitted by the optical system. In the case of relatively large source images, for example in the 16:9 format that is customary nowadays, edge regions may be absent in the transmitted image.

Generally, the field of view is small in the case of optical systems having the construction described above. In the case of HMDs, in particular, there is by contrast the desire for the largest possible field of view with image angles of the field of view of more than 20°, and preferably more than 40°.

During the transmission of polychromatic source images, as is the case for example during the transmission of video images, encompassing the entire visible spectrum in the wavelength range of approximately 425 nm to approximately 675 mm, the further issue can arise that the field of view becomes all the smaller, the larger the spectral range to be transmitted. In general, the field of view is restricted, however, even during monochromatic transmission.

During polychromatic transmission, on account of the wavelength dependence of the diffraction, this can additionally have the effect that the transmitted source image does not have color fidelity relative to the source image to be transmitted because for example the entire wavelength spectrum of the source image is not transmitted into the target image or different spectral ranges having different intensities are transmitted.

A further property of such an optical system that can restrict the field of view involves propagation of the light in the optical waveguide arrangement by total internal reflection. This type of light propagation is present, however, if the optical system is intended to be transparent at least in the user's field of view, as is desired in the case of an HUD or HMD, in particular smartglasses, such that the user can see the transmitted source image in superimposition with the real world. Generally, total internal reflections within the optical waveguide arrangement occur, however, only if the light incident on the optical interface(s) of the optical waveguide arrangement has an angle of incidence that is greater than the critical angle of total internal reflection.

SUMMARY

The disclosure seeks to develop or specify an optical system and a method to the effect that they make it possible to realize display systems having a larger field of view than the display systems available in the prior art.

According to the disclosure, the first subfield and/or the at least one second subfield are/is at least partly arcuately bounded before coupling into the optical waveguide arrangement.

Furthermore, the disclosure specifies an optical method for transmitting a source image, wherein light having a field angle spectrum emanates from the source image, including the following steps:

dividing the light emanating from the source image into a first subfield, wherein the light of the first subfield has field angles in a first field angle range of the field angle spectrum, and into at least one second subfield, wherein the light of the at least one second subfield has field angles in a second field angle range—different from the first field angle range—of the field angle spectrum;

diffractively coupling in light of the first subfield and, separately from the input coupling of the light of the first subfield, diffractively coupling in the at least one second subfield into an optical waveguide arrangement and propagating the light of the first subfield and of the second subfield in the optical waveguide arrangement, wherein the first subfield and/or the at least one second subfield are/is at least partly arcuately bounded; and diffractively coupling out the first subfield and the at least one second subfield from the optical waveguide arrangement in such a way that the transmitted first subfield and the transmitted at least one second subfield of the source image are superimposed on one another after coupling out from the optical waveguide arrangement.

In the optical system according to the disclosure and the method according to the disclosure, the entire field of the source image having the entire field angle spectrum is not coupled into the optical waveguide arrangement via one individual input coupling element, rather the source image is divided into at least two subfields, wherein a respective dedicated input coupling element is assigned to the individual subfields, and wherein the individual subfields are coupled into the optical waveguide arrangement separately from one another. Only the first subfield is coupled in via the first input coupling element, and only the at least one second subfield is coupled in via the at least one second input coupling element. The subfields can be coupled into a common optical waveguide, or a dedicated optical waveguide can be assigned to each subfield. The input coupling elements for the different subfields can overlap one another or be arranged at the optical waveguide arrangement without overlapping one another. After the individual subfields have propagated through the optical waveguide arrangement, the subfields are coupled out from the optical waveguide arrangement via the output coupling arrangement and superimposed on one another, such that the user sees the complete transmitted source image.

According to the disclosure, the first subfield and/or the at least one second subfield are/is at least partly arcuately bounded before coupling into the optical waveguide arrangement. The source image, for example a display, is usually rectangular in shape. On account of the optical conditions during the transmission of the source image via total internal reflection in the optical waveguide arrangement, only a smaller field angle range can be transmitted if the source image were split into rectangular subfields. By virtue of the source image being split according to the disclosure into subfields, at least one of which is arcuately bounded, it is possible by contrast, as will be described later, to transmit a larger field angle range and thus to achieve a larger field of view.

With the optical system according to the disclosure and the method according to the disclosure, it is possible in this way to achieve significantly larger fields of view (FOVs) than with the known optical systems. The disclosure enables a larger field of view and/or the transmission of a larger wavelength range in an individual transmission channel. In the prior art, by contrast, the transmission of a larger wavelength range is accompanied by the restriction of the field of view to a smaller field of view. The optical system according to the disclosure and the method according to the disclosure, by contrast, enable the transmission of large wavelength ranges without a loss in respect of the size of the field of view.

The first subfield has a first field edge and the at least one second subfield has a second field edge, wherein the first field edge is directly adjacent to the second field edge, and wherein the first field edge is concavely arcuate and the second field edge is convexly arcuate, or wherein the first field edge is convexly arcuate and the second field edge is concavely arcuate.

In this case, the first subfield and the second subfield can have a partial overlap in the region of the first and second field edges if this is desired in order, after the individual subfields have been coupled out from the optical waveguide arrangement, to obtain a complete transmitted source image by stringing together the subfields. This is because the radii of the arcuate field edges may be slightly different from subfield to subfield, and so a slight overlap avoids a loss of image information.

Furthermore, the input coupling arrangement can have a third input coupling element for coupling in a third subfield of the source image, wherein the third subfield is arranged between the first and second subfields, and wherein the third subfield has third field edges, of which one is directly adjacent to the first field edge and the other is directly adjacent to the second field edge, and wherein both third field edges are arcuate.

In this configuration, the source image is thus split into at least three subfields, of which the outer subfields are arcuately bounded at least at one side and the central subfield is arcuately bounded on both sides. The individual arcuate field edges are arcuate approximately complementarily to one another in each case in such a way that if one field edge is concavely arcuate, the field edge directly adjacent thereto is convexly arcuate, or vice versa.

In the context of the present disclosure, however, it is not only possible to split the source image into subfields whose mutually adjacent field edges are arcuate, but it is likewise possible for the first subfield and/or the second subfield to be arcuately bounded at an outer field edge. In this configuration, accordingly, mutually adjacent field edges of the at least two subfields are not or not only the ones that are arcuate, rather at least one field edge of at least one of the subfields which is not adjacent to a field edge of the other subfield is arcuate.

Although a larger field of view by comparison with the prior art can already be achieved if the source image overall is divided into only two subfields, each of which is individually transmitted, generally provision is made for the input coupling arrangement to have a number of N input coupling elements, wherein N is an integer ≥2, which are arranged for coupling light from N different subfields of the source image having field angles from N different field angle ranges of the field angle spectrum into the optical waveguide arrangement.

Splitting the source image into more than two subfields has the advantage that particularly large fields of view having a large spectral bandwidth can be achieved. However, more input coupling elements are then also used, and the optical waveguide arrangement then possibly has a larger number of optical waveguides, which may lead to a higher complexity of the optical system.

A further improvement in the optical system according to the disclosure is achieved by virtue of the fact that the input coupling arrangement has at least two first and at least two second input coupling elements, wherein one of the two first and one of the two second input coupling elements are arranged for coupling light from the first subfield and from the second subfield, respectively, in a first wavelength range into the optical waveguide arrangement, and the other of the two first and the other of the two second input coupling elements are arranged for coupling light from the first subfield and from the second subfield, respectively, in a second wavelength range, which is different from the first wavelength range, into the optical waveguide arrangement.

In the case of this measure, in addition to the spatial division of the source image into a plurality of subfields, a division of the total spectral range emanating from the source image into different spectral subranges ("different color channels") takes place as well. With this measure, the disadvantageous effects described in the introduction regarding the wavelength dependence of diffraction can be reduced or even eliminated given appropriate design of the input coupling elements, such that overall a polychromatic transmission of the source image with a large field of view can be achieved.

Preferably, in the case of the measure mentioned above, the wavelength spectrum is subdivided into three wavelength ranges, preferably into red, green and blue. The division of the total spectral range of the light emanating from the source image can be achieved via spectral filters, for example.

In a preferred development of the measure mentioned above, the optical waveguide arrangement has a first optical waveguide for the propagation of light in the first wavelength range and has at least one separate second optical waveguide for the propagation of light in the at least one second wavelength range.

In accordance with this configuration, therefore, separate transmission channels are used for the transmission of the different wavelength ranges. In this case, the individual optical waveguides are preferably arranged or stacked one above another transversely with respect to the light propagation direction in the optical waveguides.

In a further preferred configuration, the optical waveguide arrangement has a first optical waveguide, into which the first input coupling element couples the light from the first subfield, and at least one second optical waveguide, into which the at least one second input coupling element couples the light from the at least one second subfield.

In this configuration, also for the transmission of the individual subfields of the source image in each case a dedicated transmission channel is used, which can be arranged in a manner lying one above another.

In connection with the abovementioned measure of the spectral division of the source image light into three color channels and in the case where the source image is spatially divided into two subfields, this results overall in 2×3, i.e. six, transmission channels for the source image, corresponding to the division of the source image into two subfields and the division of the wavelength spectrum into three wavelength ranges.

As an alternative to the configuration mentioned above, however, the optical waveguide arrangement can also have an optical waveguide, into which the first input coupling element couples the light from the first subfield and the at least one second input coupling element couples in the light from the at least one second subfield, wherein the first input coupling element and the second input coupling element are arranged in opposite end regions of the optical waveguide.

In a configuration similar thereto, the optical waveguide arrangement can have an optical waveguide, into which the first input coupling element couples the light from the first subfield and the at least one second input coupling element couples the light from the at least one second subfield, wherein the optical waveguide has two mutually parallel first and second sections and at a first end a third section perpendicular to the first and second sections, and wherein the first and second input coupling elements are arranged at free second ends of the optical waveguide.

In these configurations it is advantageous that the optical waveguide arrangement overall has fewer optical waveguides or layers, which leads to a thinner design transversely with respect to the light propagation in the optical waveguide arrangement. A further advantage of these configurations is that reflection losses during the transmission of the source image are reduced. Yet another advantage is that the output coupling arrangement can manage with fewer output coupling elements.

In a further preferred configuration, the output coupling arrangement has a first output coupling element, which is arranged for coupling light from the first subfield of the source image out from the optical waveguide arrangement, and at least one second output coupling element, which is arranged for coupling light from the at least one second subfield of the source image out from the optical waveguide arrangement.

In this configuration, the at least two subfields of the source image are coupled out from the optical waveguide arrangement via output coupling elements specifically assigned to the respective subfield. This has the advantage, in particular, that the respective output coupling element can be individually adapted in relation to the associated input coupling element, in particular can be configured symmetrically with respect thereto or at least with the same grating period.

In connection with one of the configurations mentioned above, according to which the optical waveguide arrangement has at least two optical waveguides for the transmission of the at least two subfields, it is furthermore preferred if the first output coupling element couples light out from the first optical waveguide and the second output coupling element couples light out from the second optical waveguide.

In connection with one of the measures mentioned above, according to which the at least two subfields are transmitted via a common optical waveguide, it is preferably provided that the first output coupling element and the second output coupling element couple light out from the one optical waveguide.

In this connection it is furthermore preferred if the output coupling arrangement has a plurality of first output coupling elements and a plurality of second output coupling elements, wherein the first and second output coupling elements are arranged alternately along the optical waveguide.

The measure mentioned above has the advantage of a particularly compact design of the optical system.

In a further preferred configuration, which is advantageous in particular in combination with one or more of the configurations mentioned above, according to which the optical waveguide arrangement has a common optical waveguide, into which the at least two subfields are coupled, provision is made for the output coupling arrangement to have only one first output coupling element.

In this case, it is advantageous that the number of output coupling elements for the optical system to be reduced.

In further preferred configurations, the first input coupling element and/or the at least one second input coupling element have/has a transmissive optical diffraction grating structure or a reflective optical diffraction grating structure.

In the same way, the first output coupling element and/or the at least one second output coupling element can have a transmissive optical diffraction grating structure or a reflective optical diffraction grating structure.

Reflective optical diffraction grating structures, in particular in the form of metallic gratings, during input coupling have the advantage of a higher input coupling efficiency, which is also homogenous over the angle of incidence. For the TM (transverse magnetic) polarization, the input coupling efficiency is virtually constant, such that a polarized input coupling could be preferred. On the other hand, the use of polarized light means a loss of 50% of the intensity, and unpolarized input coupling is significantly simpler. Since the diffraction grating structure effects polarization, however, after the input coupling a mixture of the two polarizations can be achieved by virtue of beam splitters being fitted at or between the optical waveguides, such that the beam paths pass repeatedly through the beam splitters, which transmit in each case 50% into each polarization and thus bring about a mixture of both polarizations.

In a further preferred configuration, the diffraction grating structure has webs that are inclined relative to the grating base, or the diffraction grating structure is a blazed grating.

Diffraction grating structures having inclined webs and blazed gratings, for the optical system of a display system, are preferable to binary gratings with regard to their input coupling and/or output coupling efficiency. Blazed gratings, in particular, have the advantage that their diffraction efficiency can be maximal in a specific order of diffraction and minimal in the other orders of diffraction.

In the case where the output coupling arrangement has only one output coupling element, as may be provided in a configuration mentioned above, the output coupling element can have the same grating period, but a variable shape of the grating structures, over its extent along the optical waveguide, in order that the two subfields that are transmitted via the one optical waveguide are thus coupled out in a suitable manner.

In this case, provision can be made for the shape of the grating structures to be symmetrical in a central region of the output coupling element and to be increasingly asymmetrical in regions on both sides of the central region.

By way of example, the central region of the output coupling element can have a sinusoidal grating structure having the same output coupling efficiency for both subfields, while in the regions on both sides of the central region the grating structure is increasingly blazed and the output coupling efficiency is optimized for respectively one of the subfields, wherein the inclination of the blazed grating structures in the two regions on both sides of the central region is opposite to one another.

In a further preferred configuration, the diffraction grating structure of the first input coupling element and the diffraction grating structure of the first output coupling element have the same grating period, and/or the diffraction grating structure of the second input coupling element and the diffraction grating structure of the second output coupling element have the same grating period.

As a result of this measure, a symmetry between input and output coupling is achieved, that is to say that a light ray that is incident on the input coupling arrangement from the source image at a specific field angle is coupled out from the optical waveguide arrangement via the output coupling arrangement at the same field angle. In other words, identical angles of incidence are transmitted into identical angles of emergence.

In a further preferred configuration, the optical system has a device for dividing the source image field into the first and at least one second subfield.

Such a device can be realized by beam deflecting elements in proximity to the source image in order to divide the light emanating from the source image into a plurality of subfields. The advantage here is that the source image prior to coupling into the optical waveguide arrangement need not be duplicated in a number corresponding to the number of subfields. This last is likewise possible, however.

In particular, it is preferred if the device for dividing the source image has an optical arrangement having at least one field stop for generating the first and/or second subfield having an at least partly arcuate field edge.

For this purpose, the source image can be provided in a corresponding number of duplications, wherein for generating a respective one of the subfields use is made of a corresponding field stop that masks out a part of the source image with a bent field edge.

Provision may likewise be made, however, for the device for dividing the source image to have an electronic device for electronically generating the first and/or second subfield having an at least partly arcuate field edge.

In this case, the pixels of the source image (display) are driven such that a portion of the pixels remains dark, wherein the arrangement of dark pixels is arcuately bounded.

In a further preferred configuration, the optical waveguide arrangement is planar.

The advantage here is that the optical waveguide arrangement and in particular the coordination of the input coupling elements and the output coupling elements can be realized in a simple manner because no wavefront aberrations caused by curvature of the optical waveguide arrangement need be taken into account.

In an alternative preferred configuration, the optical waveguide arrangement is curved.

The advantage here is that the optical system including a curved optical waveguide arrangement can be integrated more simply into glasses worn by the user, for example if the display system in which the optical system is used is configured as an HDM.

In connection therewith there is the problem, however, that, owing to the curvature of the optical waveguide arrangement, wavefront aberrations occur which are caused by the total internal reflections of the light at the curved interfaces of the optical waveguide arrangement.

In a preferred development of the measure mentioned above, the optical waveguide arrangement has between the input coupling arrangement and the output coupling arrangement a diffractive correction arrangement in order to correct aberrations of the wavefront of the transmitted light.

Wavefront aberrations, be they geometric and/or chromatic in nature, which are caused by the curvature of the optical waveguide arrangement, are compensated for via the diffractive correction arrangement, which has a correction diffraction grating, for example. The light propagating along the curved optical waveguide arrangement between the input coupling element and the output coupling element "sees" a planar optical waveguide arrangement on account of the diffractive correction arrangement. This in turn has the advantage that the relations of a planar optical waveguide arrangement can be taken as a basis for the calculation of the input coupling and output coupling element(s).

The abovementioned aspect of a curved optical waveguide with a correction arrangement is also regarded as an independent disclosure, specifically not only in conjunction with a diffractive input coupling arrangement and a diffractive output coupling arrangement, but also with a non-diffractive input coupling arrangement or output coupling arrangement, and likewise without the spatial division of the source image into a plurality of subfields, and without the arcuate boundary of the subfield(s).

In further configurations of this aspect, the correction arrangement can be arranged only in sections or locally along the curved optical waveguide arrangement. In this case, the correction arrangement compensates for the cumulative wavefront aberrations that can arise at the plurality of reflections in the curved optical waveguide arrangement. Alternatively, however, the correction arrangement can also be embodied over the entire area of the curved optical waveguide arrangement. This enables a piecewise compensation of the wavefront aberrations generated in the curved optical waveguide arrangement, for example of the wavefront aberration generated by the respectively directly preceding or directly succeeding reflection in the curved optical waveguide arrangement. In particular, aberrations that arise on account of the curved optical waveguide from one output coupling location to the next are thus corrected by the correction arrangement. Thus, within a region in which light is coupled out via a plurality of output coupling locations, a complete correction of the imaging beam path is ensured and a corrected image of the source image is offered to the observer at each output coupling location.

The correction arrangement can be designed either for the inner (in relation to the radius of curvature) or for the outer surface or for both surfaces of the curved optical waveguide arrangement or of the curved optical waveguide. The effect of the curved optical waveguide arrangement on wavefront aberrations and possibly induced chromatic aberrations can be corrected in the same grating or in a second grating of the correction arrangement.

Further advantages and features are evident from the following description and the accompanying drawing.

It goes without saying that the aforementioned features and those yet to be explained below may be used not only in the respectively specified combination but also in other combinations or on their own, without departing from the scope of the present disclosure.

BRIEF DESCRIPTION OF THE DRAWINGS

Exemplary embodiments of the disclosure are illustrated in the drawing and described in more detail below with reference thereto. In the figures:

FIGS. 23A-B show devices for generating a subfield from a source image having an arcuate boundary in two embodiment variants;

FIG. 24 shows a basic schematic diagram similar to the right-hand basic schematic diagram in FIG. 20 for illustrating the effect if the source image is not divided into a plurality of arcuately bounded subfields;

DETAILED DESCRIPTION

In order to afford a better understanding of the configurations according to the disclosure of optical systems for transmitting a source image, which configurations will be described later, firstly the physical relationships of diffractive input coupling of light into an optical waveguide, the propagation of the light in the optical waveguide and the diffractive output coupling of the light from the optical waveguide will be explained with reference to FIGS. 1 to 8.

Figure 1:
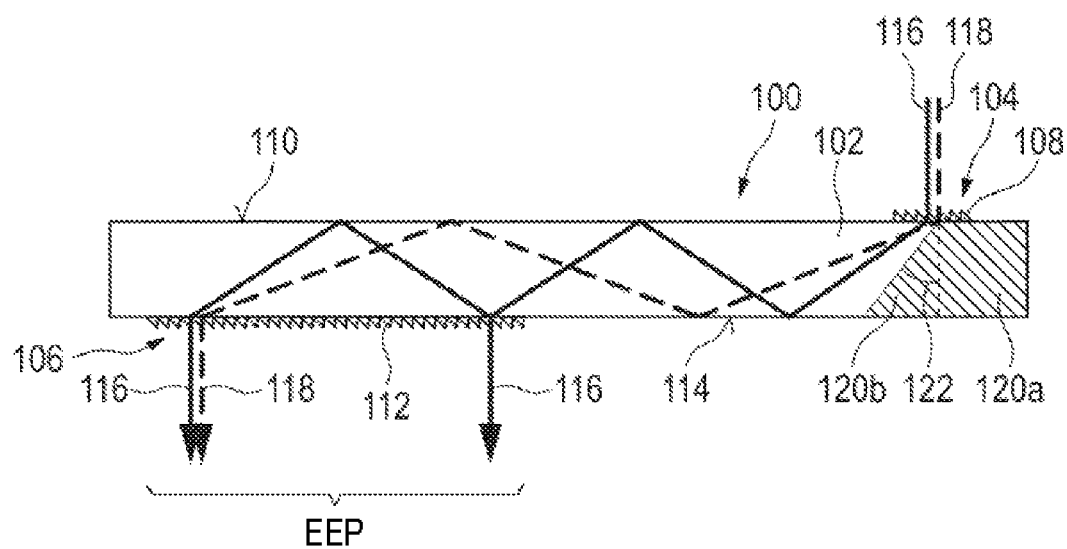
FIG. 1 shows a basic schematic diagram for elucidating the physical relationships of the diffractive input coupling of two light rays into an optical waveguide and the diffractive output coupling thereof for two different wavelengths.

FIG. 1 firstly shows an optical waveguide arrangement 100 including an optical waveguide 102, which is configured as a plane-parallel plate. A diffractive input coupling arrangement 104 and a diffractive output coupling arrangement 106 are arranged at the optical waveguide arrangement 100.

The diffractive input coupling arrangement 104 has a transmissive diffraction grating structure 108, which is configured for example as a blazed grating and which is arranged at a first surface 110 of the optical waveguide 102.

The output coupling arrangement 106 has a diffraction grating structure 112, which is arranged at a surface 114 situated opposite the surface 110 and is likewise transmissive.

Furthermore, FIG. 1 shows two light rays 116, 118 that are incident on the input coupling arrangement 104 perpendicularly. Both light rays 116 and 118 are coupled into the optical waveguide 102 with diffraction at the input coupling arrangement 104. Within the optical waveguide 102, the two light rays 116, 118 propagate by total internal reflection at the surfaces 110 and 114. As soon as the light rays 116, 118 reach the output coupling arrangement 112, they are coupled out from the optical waveguide 102 with diffraction. The case in which the light of the light ray 118 has a longer wavelength than the light of the light ray 116 shall be assumed here. On account of the wavelength dependence of diffraction, the light ray 118 is diffracted at the input coupling arrangement 104 in the same order of diffraction with a larger diffraction angle than the light ray 116, as is evident from FIG. 1.

In principle, it holds true that the exit pupil of a source image can be expanded via diffractive input coupling of light into the optical waveguide arrangement 100, as is indicated by the region EEP (expanded exit pupil) in FIG. 1.

If the diffraction grating structures 108 and 112 are symmetrical with respect to one another, the light rays 116, 118 are coupled out from the optical waveguide 102 at an angle of emergence that is identical to the angle of incidence of the light rays 116 on the input coupling arrangement 104, as is shown in FIG. 1 for normal incidence of the light rays 116, 118 on the input coupling arrangement 104. However, this also holds true for non-normal incidence on the input coupling arrangement 104.

FIG. 1 depicts two regions 120a and 120b illustrated in a hatched manner, which are not usable for the input coupling of light. The region 120a cannot be used because light diffracted into this region cannot propagate in the direction toward the output coupling arrangement 106. The region 120b cannot be used because light diffracted into this region is incident on the surface 114 at an angle of incidence that is less than the critical angle 122 of total internal reflection, such that light diffracted into this region at least partly emerges from the surface 114 and thus likewise cannot propagate to the output coupling arrangement without loss of intensity.

As is furthermore evident from FIG. 1, on account of the multiple output coupling, less light having the shorter wavelength (light ray 116) is coupled out compared with light having the longer wavelength (light ray 118). This leads to polychromatic source images being transmitted without color fidelity.

Figure 2:
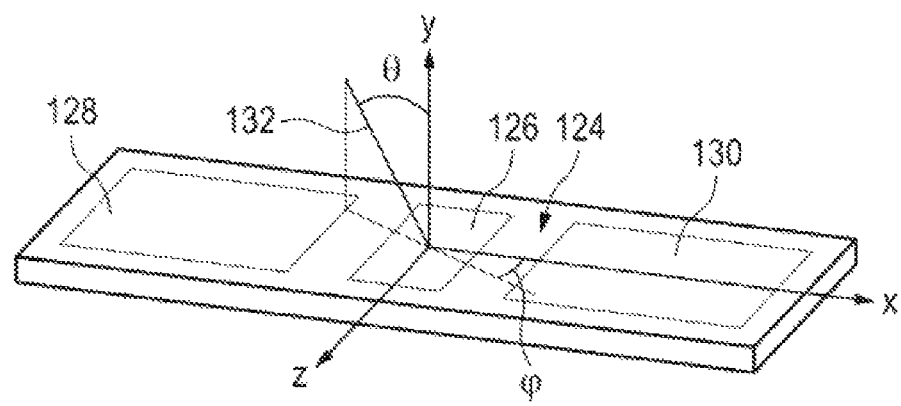
FIG. 2 shows an optical waveguide with one input coupling arrangement and two output coupling arrangements in accordance with the prior art.

FIG. 2 shows an optical waveguide arrangement 124 with one diffractive input coupling arrangement 126 and two diffractive output coupling arrangements 128 and 130. Such an arrangement is described in the article by Tapani Levola cited in the introduction: "Diffractive optics for virtual reality displays". This arrangement can be used for the binocular transmission of a source image into a binocular target image. θ and φ denote the angles of an incident light ray 132 with respect to an axis y and an axis x, respectively.

In order that only the 0 and ±1st orders of diffraction are coupled in via the input coupling arrangement 126, the grating period d of the diffractive input coupling arrangement 126 satisfies the following condition:

$$d \leq \lambda(1+|\alpha_{0,max}|),$$

wherein $\alpha_0 = \sin\theta \cos\varphi$ and $\lambda$ is the wavelength of the light.

The 0 order of diffraction will fall below the critical angle of total internal reflection, and so the 0 order of diffraction cannot be used, while the +1st order of diffraction can propagate to the output coupling arrangement 128 and the −1st order of diffraction can propagate to the output coupling arrangement 130 and in each case be coupled out there.

$\alpha_{0,max}$ is thus a measure of the maximum angle of incidence of light on the input coupling arrangement 126 for a predefined grating period d of the input coupling arrangement 126 if only the +1st or −1st order of diffraction is intended to be used. Higher orders of diffraction should be avoided since they lead to ghost images.

As has been explained above with reference to FIG. 1, however, the diffraction angles are different for different wavelengths of the light. This also applies to the +1st order of diffraction and the −1st order of diffraction. This has the consequence that, as illustrated in FIG. 1, the step length of light rays of different wavelengths within the optical waveguide 102 between in each case two successive total internal reflections is different.

If consideration is given to the wavelength range of the visible spectrum extending from approximately 425 nm (blue) to approximately 675 nm (red), the result is a not inconsiderable different step procedure between the total internal reflections of light rays in the red spectral range and light rays in the blue spectral range.

Figure 3:
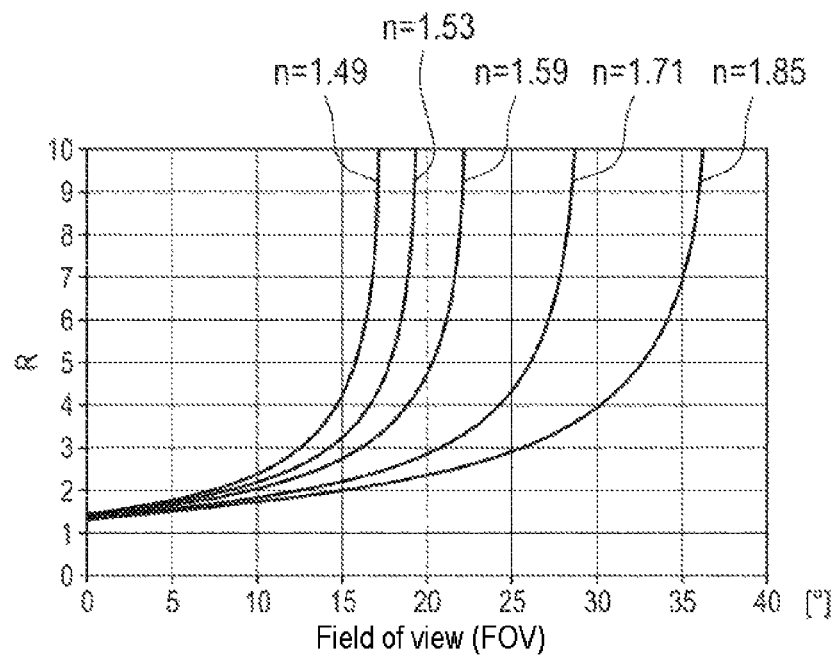
FIG. 3 shows a diagram showing the maximum ratio of the step length between total internal reflections of a light ray having a long wavelength to the step length between total internal reflections of a light ray having a short wavelength within an optical waveguide for different materials of optical waveguides as a function of the field of view.

FIG. 3 shows a diagram showing a coefficient R, which denotes the maximum ratio of the step length between total internal reflections of a light ray having a maximum wavelength (in the visible range) to the step length between total internal reflections of a light ray having a minimum wavelength (in the visible range) within an optical waveguide for different materials of optical waveguides as a function of the field of view (FOV) for different materials having different refractive indices. The coefficient curves R for materials having refractive indices n=1.49; n=1.53; n=1.59; n=1.71 and n=1.85 are illustrated. FIG. 3 reveals that as the field of view increases, which is accompanied by increasing angles of incidence on the input coupling arrangement, the coefficient R increases, although the increase is smaller as the refractive index increases. R should not be greater than 5. For R≤5, it is possible to achieve only fields of view of approximately 15° for the smallest refractive index of n=1.49 considered in FIG. 3, and fields of view of approximately 32.5° for the largest refractive index of 1.85 considered in FIG. 3.

For the refractive index n=1.71, which is that of the material MGC171, for example, it is possible to achieve a field of view of approximately 25° at R=5 if light in the red spectral range and light in the green/blue spectral range are transmitted separately in separate, stacked optical waveguides.

Figure 4:
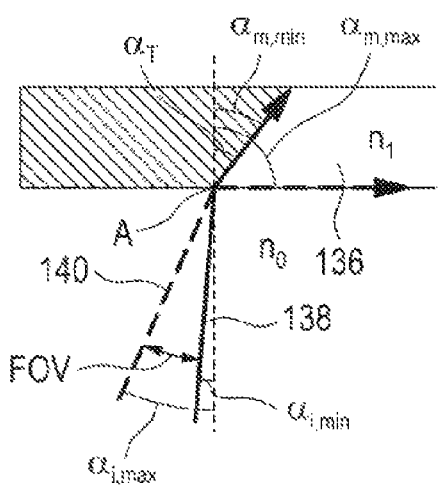
FIG. 4 shows a further basic schematic diagram for elucidating physical relationships in the case of diffractive input coupling of light into an optical waveguide and propagation of the light via total internal reflection in the optical waveguide.

The relationships of diffractive input coupling of light into an optical waveguide arrangement 136 and propagation of the light in the optical waveguide arrangement 136 via total internal reflection are generally elucidated with reference to FIG. 4. For this purpose, FIG. 4 shows two incident light rays 138 and 140, which are incident from a medium having a refractive index no at angles of incidence $\alpha_{i,max}$ and $\alpha_{i,min}$ and are coupled with diffraction into the optical waveguide arrangement 136, which has a refractive index $n_1$.

Generally, for a light beam coming from a medium having the refractive index $n_0$ and incident at the angle $\alpha_i$ into the optical waveguide arrangement 136 having the refractive index $n_1$ with diffractive transmissive input coupling at the input coupling location A, the Fresnel equation holds true:

$$n_1 \sin\alpha_m = m\frac{\lambda}{d} + n_0 \sin\alpha_i,$$

wherein m is the order of diffraction, $\alpha_m$ is the diffraction angle in the m-th order of diffraction, d is the grating period of the input coupling arrangement and $\lambda$ is the wavelength of the light.

For the 0 order of diffraction (m=0), the Fresnel equation reduces to Snell's law of refraction. In this case, $\alpha_{m=0}$ is the angle of refraction. For m=±1, ±2, . . . it is found that the diffraction angle $\alpha_m$ is proportional to the wavelength $\lambda$ (the wavelength dependence of the refractive index $n_1$ is negligible by comparison).

In order that a light ray coupled into the optical waveguide arrangement 136 can propagate by total internal reflection in the optical waveguide arrangement 136, a further condition is that the diffraction angle $\alpha_m$ is greater than the critical angle of total internal reflection $\alpha_T$.

The light ray 140 in FIG. 4 is incident at the maximum angle of incidence $\alpha_{i,max}$ which is still just diffracted into the optical waveguide arrangement 136 at the diffraction angle $\alpha_{m,max}$. As is evident from FIG. 4, however, this light ray propagates along the surface of the optical waveguide arrangement 136 and, consequently, can just no longer undergo total internal reflection. The light ray 138 is incident on the optical waveguide arrangement 136 at the angle of incidence $\alpha_{i,min}$, and is diffracted into the optical waveguide arrangement 136 at the diffraction angle $\alpha_{m,min}$. However, the diffraction angle $\alpha_{m,min}$ is already the critical angle of total internal reflection $\alpha_T$. Consequently, the light rays 138 and 140 represent the outermost theoretical limiting rays that can be transmitted through the optical waveguide arrangement as a result of diffractive input coupling into the optical waveguide arrangement 136. The angle between these two light rays 140, 138 is the field angle spectrum, or the maximum field of view FOV, which can accordingly be transmitted.

On account of the dependence of the diffraction angles on the wavelength of the light and the condition that the input coupling of light into the optical waveguide arrangement satisfies the condition of total internal reflection, it is found that the transmittable field angle spectrum and thus the field of view and also the transmittable wavelength spectrum are limited. For a material of the optical waveguide arrangement which has a comparatively high refractive index, as is the case for the material polycarbonate having a refractive index of 1.588, it is not even possible to transmit the entire visible wavelength spectrum having a spectral width of 255 nm (425 nm to 680 nm) with a field of view of 0°.

Figure 5:
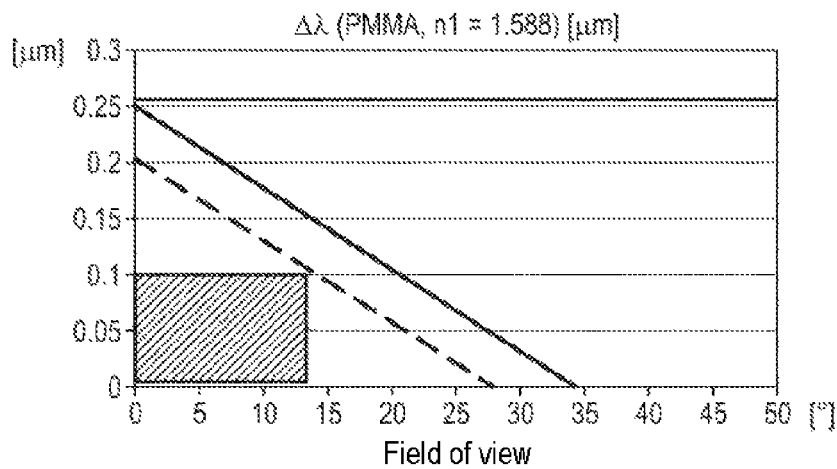
FIG. 5 shows a diagram showing the maximum transmittable wavelength range as a function of the field of view.

This substantive matter is illustrated in FIG. 5, which illustrates the wavelength spectrum $\Delta\lambda$ that is transmittable as a function of the field of view (FOV) for an optical waveguide arrangement composed of polycarbonate (n=1.588). The solid line shows the curve for the theoretically transmittable wavelength spectrum $\Delta\lambda$, and the interrupted line shows the curve for the wavelength spectrum $\Delta\lambda$ that is transmittable in practice, in the case of which an offset of 5° with respect to the angles of incidence of the theoretically possible limiting rays (138, 140, see FIG. 4) was taken into account in relation to the theoretical curve. For the material polycarbonate, it is possible to achieve a theoretical field of view of approximately 30° only with absolutely monochromatic transmission, and a wavelength spectrum $\Delta\lambda$ having a spectral width of 250 nm can be transmitted even theoretically only with a field of view of 0°. The limiting values in practice are even still below both the values mentioned above, as is evident from FIG. 5 (interrupted line).

The region depicted in a hatched manner in FIG. 5 indicates that wavelengths in a spectral range having a width of 100 nm can be transmitted with a field of view of a maximum of 14°.

Figure 6:
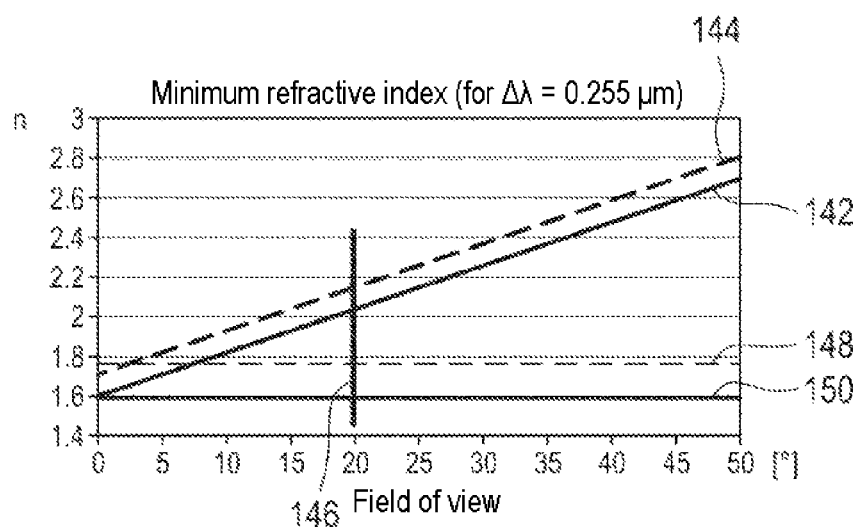
FIG. 6 shows a diagram showing the minimum refractive index of the material of an optical waveguide as a function of the field of view.

FIG. 6 shows a diagram illustrating the minimum refractive index n as a function of the field of view to be transmitted if the entire visible spectral range $\Delta\lambda$ having a spectral width of 255 nm is intended to be transmitted.

The solid line shows the theoretical curve of the minimum refractive index n, and the interrupted line 144 shows the curve in practice. FIG. 6 shows that refractive indices of significantly above 2 are used for transmitting large fields of view with the full visible wavelength spectrum. In order to transmit a field of view of 20° in the full visible wavelength spectral range, a refractive index of 2.16 (vertical line 146) is thus used in practice. However, this is not achievable with conventional materials for optical purposes. By way of example, a line 148 in FIG. 6 shows the refractive index of PTU, an episulfide, and a line 150 shows the refractive index of polycarbonate, which generally tend to be suitable as optical materials. Furthermore, it should be noted that the use of materials having a refractive index of significantly greater than 2 has the disadvantage that 2nd and higher orders of diffraction are also coupled into the optical waveguide arrangement, but this should be avoided, as already mentioned above, in order to avoid ghost images.

Figure 7:
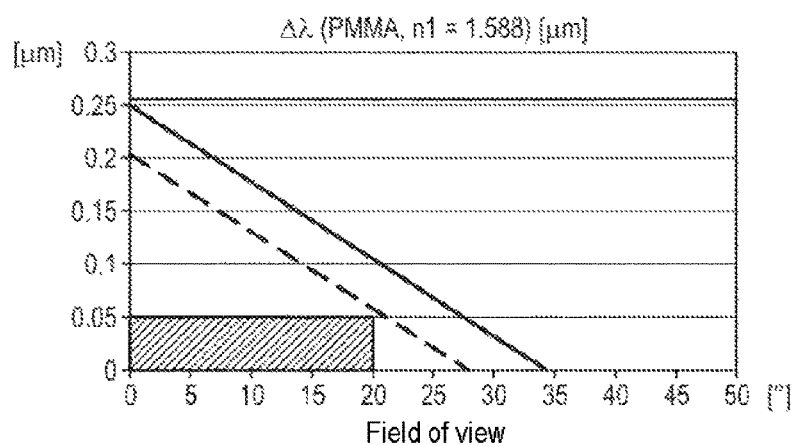
FIG. 7 shows a diagram, as in FIG. 5, showing the maximum transmittable wavelength range as a function of the field of view.

FIG. 7 shows the diagram in FIG. 5 again, but now a region is hatched which indicates that a wavelength spectrum Δλ having a spectral bandwidth of less than 50 nm can be transmitted with a field of view of 20°.

In order to be able to transmit a source image polychromatically, that is to say in the entire visible spectral range, consideration was given to using a dedicated transmission channel in each case for the transmission of individual spectral ranges, in order to solve the problem of different step lengths at different wavelengths. This is illustrated in FIG. 8.

Figure 8:
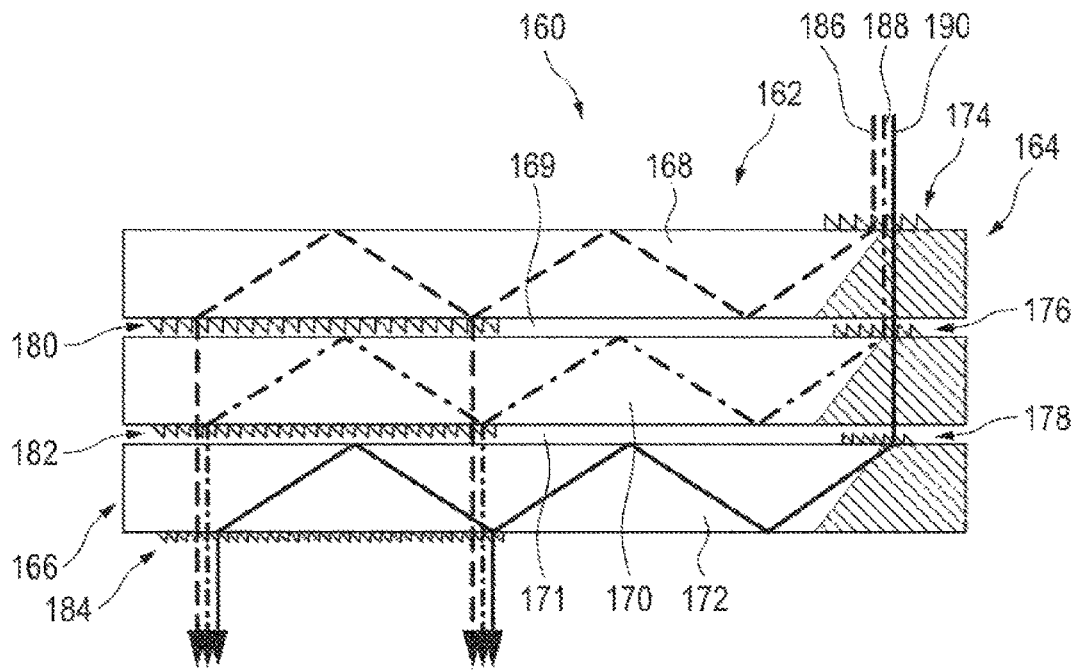
FIG. 8 shows a basic schematic diagram of an optical system with color multiplexing.

FIG. 8 shows an optical system 160 for transmitting a source image, including an optical waveguide arrangement 162, a diffractive input coupling arrangement 164 and a diffractive output coupling arrangement 166. The optical waveguide arrangement 162 has three optical waveguides 168, 170, 172 in a stacked arrangement. A respective air space 169, 171 is situated between the optical waveguides 168 and 170, 172, wherein the air spaces 169, 171 can however also be filled by a medium whose refractive index is lower than the refractive indices of the optical waveguides 168, 170, 172.

The input coupling arrangement 164 has three input coupling elements 174, 176, 178, each having diffraction grating structures.

The output coupling arrangement 166 has output coupling elements 180, 182 and 184.

The input coupling elements 174, 176, 178 are each tuned to a specific wavelength range. The input coupling element 174 is tuned such that light (ray 186) in the red spectral range is coupled into the optical waveguide 168 in the first order of diffraction, while light in the green and blue spectral range is transmitted without diffraction. The input coupling element 176 is tuned to diffracting light (ray 188) in the green spectral range, wherein the green light is correspondingly coupled into the optical waveguide 170 in the first order of diffraction, while blue light is transmitted without diffraction, and the input coupling element 171 is tuned to diffracting light (ray 190) in the blue spectral range into the optical waveguide 172.

The output coupling element 180 is tuned to diffractively coupling light in the red spectral range out from the optical waveguide 168, while the output coupling elements 182 and 184 are tuned to transmitting the light in the red spectral range without diffraction. The output coupling element 182 is correspondingly tuned to diffractively coupling light in the green spectral range out from the optical waveguide 170, and the output coupling element 184 is tuned to diffractively coupling light in the blue spectral range out from the optical waveguide 172.

The input coupling elements 174, 176, 178 are furthermore tuned such that the light from the respective spectral range is coupled into the associated optical waveguide 168, 170, 172 at approximately the same diffraction angle, such that the step size between individual total internal reflections within the optical waveguides 168, 170, 172 is identical.

The order of the arrangement of the gratings 174, 176 and 178 for the diffraction of the different spectral ranges need not correspond to the order in FIG. 8 and can be adapted to as desired, and be reversed, for example.

Via the color multiplexing realized with the optical system 160 in FIG. 8, although the entire visible wavelength spectrum of a source image can be transmitted, the field of view of the optical system 160 is still restricted to an angular range of below 20°. This is evident from FIGS. 5 and 7, which reveal that only a field of view of 20° can be achieved per transmission channel with a transmitted spectral range having a spectral width of 50 nm, and even only a field of view of 14° can be achieved with a transmitted spectral range having a spectral width of 100 nm per channel.

A further narrowing of the individual spectral ranges is not desired in connection with RGB displays as image generators and moreover, as shown in FIGS. 5 and 7, does not lead to sufficiently large field angles where FOV>20°.

An exemplary embodiment of an optical system with which fields of view of more than 20° can be achieved is described with reference to FIG. 9.

Figure 9:
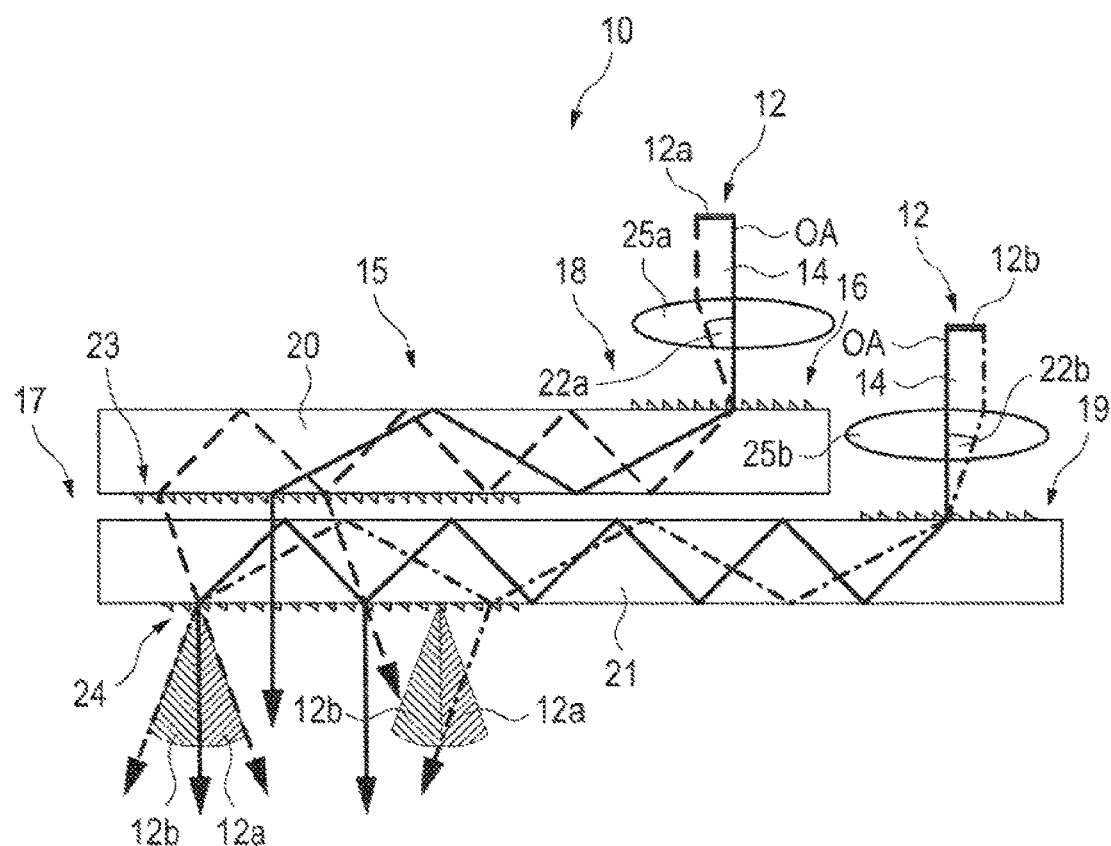
FIG. 9 shows one exemplary embodiment of an optical system according to the disclosure.

FIG. 9 shows an optical system 10 for transmitting a source image 12. The optical system 10 has an optical waveguide arrangement 15, in which light can propagate by total internal reflection. Furthermore, the optical system 10 has a diffractive optical input coupling arrangement 16 for coupling the light 14 emanating from the source image 12 into the optical waveguide arrangement 15. The optical system 10 additionally has a diffractive optical output coupling arrangement 17 for coupling the light that has propagated in the optical waveguide arrangement 15 out from the optical waveguide arrangement 15. The input coupling arrangement 16 has a first diffractive input coupling element 18 and a second diffractive input coupling element 19. The first diffractive input coupling element 18 is arranged at a first optical waveguide 20 of the optical waveguide arrangement 15, and the second diffractive input coupling element 19 is arranged at a second optical waveguide 21 of the optical waveguide arrangement 15. In this case, the two optical waveguides 20 and 21 are arranged in a stacked manner.

In contrast to the optical systems described previously, the source image 12 is spatially divided into at least two subfields 12a and 12b, wherein the first subfield 12a is coupled into the optical waveguide 20 via the first input coupling element 18, while the second subfield 12b is coupled into the second optical waveguide 21 via the second input coupling element 19, separately from the first subfield 12a.

In line with the division of the source image 12 into at least two subfields 12a, 12b, . . . , into exactly two subfields 12a and 12b in the present exemplary embodiment, the field angle spectrum emanating from the source image 12 is also correspondingly divided into a plurality of, here two, field angle ranges 22a and 22b. Consequently, light 14 with field angles from a first field angle range 22a emanates from the first subimage 12a, and light 14 with field angles from a second field angle range 22b emanates from the second subfield 12b. By way of example, in the case where the source image 12 is divided into two subfields, the field angle spectrum emanating from the source image 12 can be divided into a first field angle range having field angles in a range of −α to 0° and into a second field angle range having field angles in a range of 0° to +α, wherein a field angle of 0° corresponds to a direction of incidence of a light ray parallel to the optical axis OA of an imaging optical unit 25a, 25b.

By way of example, the division of the source image is effected in such a way that the first subfield 12a contains field angles in a field angle range of 0° to +20°, while the second subfield 12b contains field angles in a field angle range of −20° to 0°.

The first subfield 12a is coupled into the optical waveguide 20 via the first input coupling arrangement 18, in which optical waveguide the first subfield passes by total internal reflection to a first output coupling element 23, via which the first subfield 12a is coupled out from the optical waveguide 20.

The second subfield 12b is coupled into the second optical waveguide 21 via the input coupling element 19, in which optical waveguide the second subfield passes by total internal reflection to a second output coupling element 24, via which the second subfield 12b is coupled out from the optical waveguide 21. After both subfields 12a and 12b have been coupled out from the optical waveguide arrangement 15, the transmitted subfields 12a and 12b are superimposed on one another and combined to form the full transmitted source image, wherein the field of view is the sum of the field angle ranges of the subimages 12a, 12b.

By splitting the source image 12 into a plurality of subfields, it is thus possible to realize the optical system 10 with a larger field of view, with a field of view of 2×20°=40° in the present example. In other words, by dividing the source image 12 into a plurality of subfields 12a, 12b, . . . , it is possible to transmit the full field angle spectrum of the source image 12.

While the source image 12 is divided into exactly two subfields in the exemplary embodiment shown, it is generally possible to divide the source image 12 into N subfields, wherein N is an integer ≥2, wherein the input coupling arrangement 16 then has N input coupling elements.

The concept of dividing the source image 12 into a plurality of subfields can then moreover advantageously be combined with the color multiplexing described with reference to FIG. 8. This can be realized by dividing the first subfield 12a in accordance with FIG. 8 with regard to its wavelength spectrum into two wavelength ranges (red and blue/green) or into three wavelength ranges (red, green, blue) as illustrated in FIG. 8, wherein per subimage 12a, 12b each wavelength range is assigned a dedicated input coupling element such as the input coupling elements 174, 176, 178 in FIG. 8, and correspondingly three optical waveguides, such as the optical waveguides 168, 170 and 172 in FIG. 8.

Overall, in the case of a division of the source image 12 with regard to the field angle spectrum into two subfields 12a, 12b and in the case of an additional division of the wavelength spectrum emanating from the source image 12 into three wavelength ranges, this then results overall in six transmission channels including six optical waveguides and six input coupling elements. Likewise, a corresponding number of six output coupling elements are then provided for the six transmission channels.

Referring to FIG. 9 again, the input coupling elements 18 and 19 are optimized with regard to their diffraction efficiencies in the +1st or −1st order of diffraction. The first input coupling element 18 for the input coupling of the first subfield 12a is optimized to the field angle range 22a with regard to its diffraction efficiency in the first order of diffraction. The second input coupling element 19 for the input coupling of the second subfield 12b is optimized to the field angle range 22b with regard to its diffraction efficiency in the first order of diffraction, wherein here it is desirable to take account of the opposite orientation of the angles of incidence from the field angle range 22b with respect to the angles of incidence from the first field angle range 22a relative to the optical axis OA. Moreover, the input coupling elements 18 and 19 are tuned such that the diffraction angles of light rays from the two subfields 12a, 12b, which apart from the sign have the same angle of incidence on the input coupling elements 18 and 19, are coupled into the optical waveguide 20 and 21 with the same diffraction angle, such that the step length of these light rays between the total internal reflections are identical, as is shown in FIG. 9.

The output coupling element 23 is symmetrical with respect to the input coupling element 18, such that light rays incident from the subfield 12a on the input coupling element 18 at a specific field angle are coupled out from the output coupling element 23 at the same field angle. The same applies to the adaptation of the output coupling element 24 to the input coupling element 19 for the second subfield 12b. The symmetry mentioned above is achieved in particular by virtue of the fact that the grating period of the output coupling element 23 is equal to the grating period of the input coupling element 18. The output coupling element 24 likewise has a grating period that is equal to the grating period of the input coupling element 19.

Furthermore, the diffraction efficiency of the output coupling element 24 with regard to the light coming from the first subfield 12a is minimized such that the light coming from the subfield 12a can pass through the output coupling element 24 without being diffracted or substantially without being diffracted.

The spectral ranges and used grating periods in this case depend on the refractive index of the optical waveguide 21. Examples for polycarbonate are indicated below. If the spectral range chosen is the blue spectral range having wavelengths of between approximately 430 nm and 470 nm, then this results in a grating period of approximately 300 nm for the first grating 18 and a grating period of approximately 390 nm for the second grating 19. Grating periods of 360 nm and 470 nm, respectively, result for the green spectral range having wavelengths of between 520 nm and 570 nm. For the red spectral range between 600 nm and 660 nm, by contrast, the grating periods to be chosen lie in the region of 420 nm and 550 nm, respectively, for the first and second gratings 18 and 19, respectively. The grating periods of the output coupling gratings 23, 24 should be designed respectively analogously to the input coupling gratings 18, 19.

In the exemplary embodiment shown in FIG. 9, the input coupling elements 18, 19 and the output coupling elements 23 and 24 are configured in each case as transmissive input coupling and output coupling elements, respectively, and correspondingly have transmissive optical diffraction grating structures.

However, it is likewise possible to provide, instead of transmissive input coupling elements and transmissive output coupling elements, reflective input coupling elements and/or reflective output coupling elements, which are then correspondingly arranged at the opposite surfaces of the optical waveguides 20 and 21, respectively, in contrast to the arrangement shown in FIG. 9. Reflective blazed gratings, in particular, prove to be advantageous since they have a virtually constant diffraction efficiency in the first order of diffraction over the field angle range of 0° to 20° and of −20° to 0°. The two field angle ranges can be equal in magnitude, but they can also be of different magnitudes. The two field ranges can adjoin or partially overlap one another. The homogeneity of the overlapping range can be set via the represented signal on the display.

The diffraction grating structures mentioned above, both in the case of transmissive diffraction grating structures and in the case of reflective diffraction grating structures, can be configured as blazed gratings or have trapezoidal or rectangular webs that are inclined relative to the grating base.

The division of the source image 12 into a plurality of subfields 12a, 12b, . . . can be realized by providing a corresponding number of identical source images 12, wherein stops, for example, are used to achieve the effect that only light from one subfield emanates from each of the source images.

Figure 10:
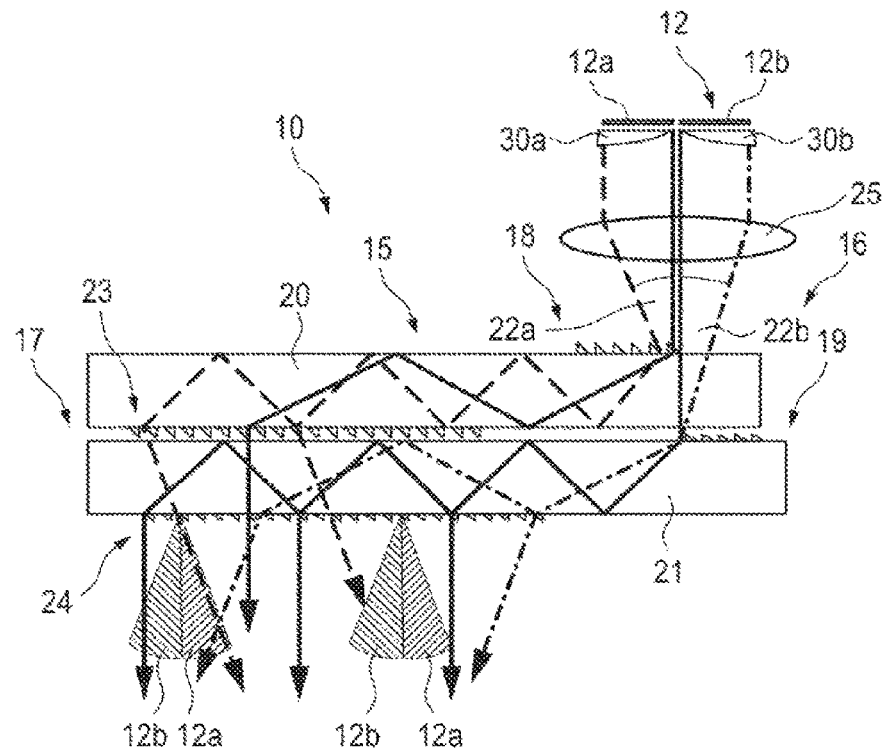
FIG. 10 shows a further exemplary embodiment of an optical system according to the disclosure.

A different possibility of dividing the source image 12 into subfields 12a, 12b, . . . is shown in FIG. 10. In accordance with FIG. 10, the source image 12 is divided into the subfields 12a, 12b, . . . via optical deflecting elements 30a, 30b, . . . . In this case, the source image has to be provided only once.

For the rest, the description concerning FIG. 9 also applies to FIG. 10.

Figure 11:
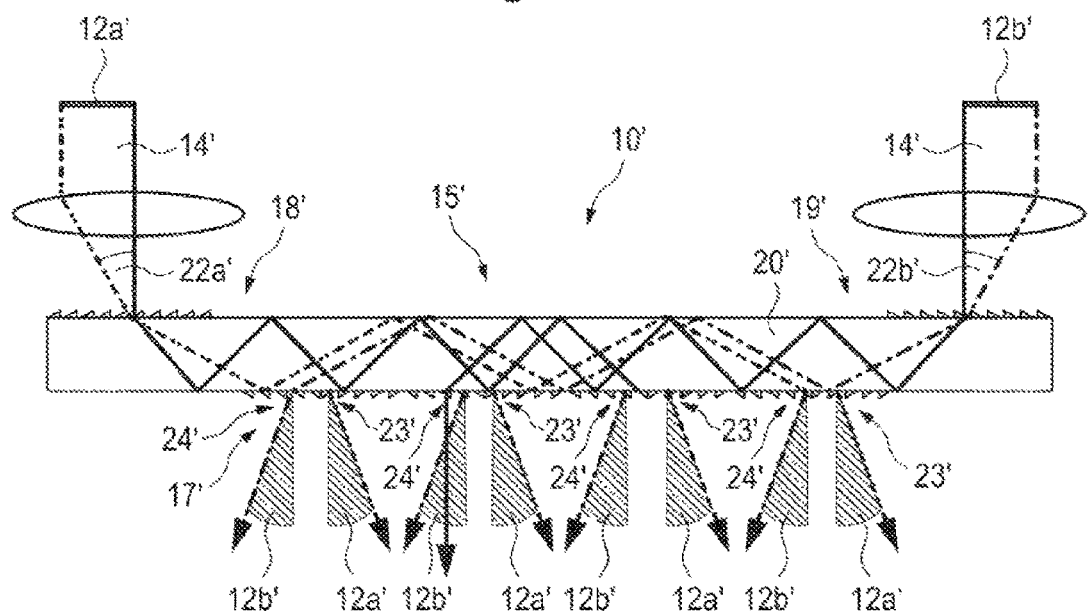
FIG. 11 shows yet another exemplary embodiment of an optical system according to the disclosure.

FIG. 11 shows a further exemplary embodiment of an optical system 10', in which elements that are comparable or identical to elements of the exemplary embodiments in FIGS. 9 and 10 are provided with the same reference sign, supplemented by a "'".

The optical system 10' has an optical waveguide arrangement 15' having only one optical waveguide 20', which serves for transmitting both the subfield 12a' and the subfield 12b'. The subfield 12a' is coupled into the common optical waveguide 20' via a diffractive input coupling element 18' and the subfield 12b' is coupled into the common optical waveguide 20' via a diffractive input coupling element 19'.

The output coupling arrangement 17' has a plurality of diffraction output coupling elements 24' and a plurality of diffractive output coupling elements 23', which are arranged alternately along the optical waveguide 20', as is shown by way of example in FIG. 11. The individual output coupling elements 24' and 23' should each have an extent of approximately 1 mm. The extent is limited by the pupil diameter of the observer for an optical system worn on the head. The pupil approximately has a diameter of 3-4 mm. In order to make both subimages visible simultaneously, the extent is chosen to be smaller than the pupil diameter (pupil division). On the other hand, the extent of the output coupling elements limits the optical resolution of the transmitted image, such that the largest possible extent is desirable. It has been found that an extent of 0.6 mm-1.5 mm mediates an ideal compromise with regard to resolution and homogeneity of the visual impression.

In FIG. 11, the input coupling elements and output coupling elements each have the same grating period. In a further embodiment, both output coupling elements 23' and 24' can be designed as a sinusoidal grating. This ensures that at every point the output coupling element couples out light from both subfields 12a' and 12b' with an average efficiency. The above-discussed disadvantages of pupil division and homogeneity of the visual impression are thereby avoided. In this case, the exact groove shape of the sinusoidal grating can vary symmetrically over the output coupling region in order to ensure homogenous output coupling over the entire output coupling region. Here the efficiency of the output coupling of the light rays of the subimage lying further away in the light path is increased in each case; by way of example, the output coupling element is designed in the left region in a manner similar to the shape of a blazed grating for the radiation of the right field half 12b' (comparable to 24'), whereas it is designed in the right region in a manner similar to the shape of a blazed grating for the radiation of the left field half 12a' (comparable to 23'), like a symmetrical sinusoidal grating in the center and a respective continuous transition therebetween.

Overall, this gives rise to a symmetrical arrangement of the optical system 10' and, in combination with the color multiplexing in accordance with FIG. 8, the number of optical waveguides of the optical waveguide arrangement 15' is halved, that is to say that overall only three optical waveguides are used in the case where the wavelength spectrum is divided into three separately transmitted wavelength ranges.

The optical waveguide arrangements 15 and 15' described above are configured in each case as planar optical waveguide arrangements. This simplifies the calculation and optimization of the input coupling elements 18 and 18', respectively, and 19 and 19', respectively, and of the output coupling elements 23 and 23', respectively, and 24 and 24', respectively, with regard to their diffraction properties for the use described above. For an integration of the optical systems 10 and 10', respectively, into glasses worn by the user, which usually have curved lenses, it is desirable, however, that the optical waveguide arrangements 15 and 15', respectively, can be curved.

Exemplary embodiments of optical systems 40 including a curved optical waveguide arrangement 42 having a curved optical waveguide 44 are shown in FIGS. 12A to 12E. Light 47 coming from a source image (not illustrated) is coupled into the optical waveguide 44 via an input coupling arrangement 46 and is coupled out again from the optical waveguide via an output coupling arrangement 48. A correction arrangement 50 is situated between the input coupling arrangement 46 and the output coupling arrangement 48, the correction arrangement being designed to correct geometric and/or chromatic aberrations of the wavefront that are caused by the total internal reflections along the curved course of the optical waveguide arrangement 42.

The correction arrangement 50 here is a diffractive correction arrangement having a diffraction grating structure. In the case of the correction arrangement 50, the correction effect on the wavefront aberrations is of primary importance in the configuration. The diffraction grating structure of the correction arrangement can be calculated in accordance with the imaging aberrations to be corrected. FIGS. 12A to 12E show various examples of correction arrangements 50.

Figure 12A:
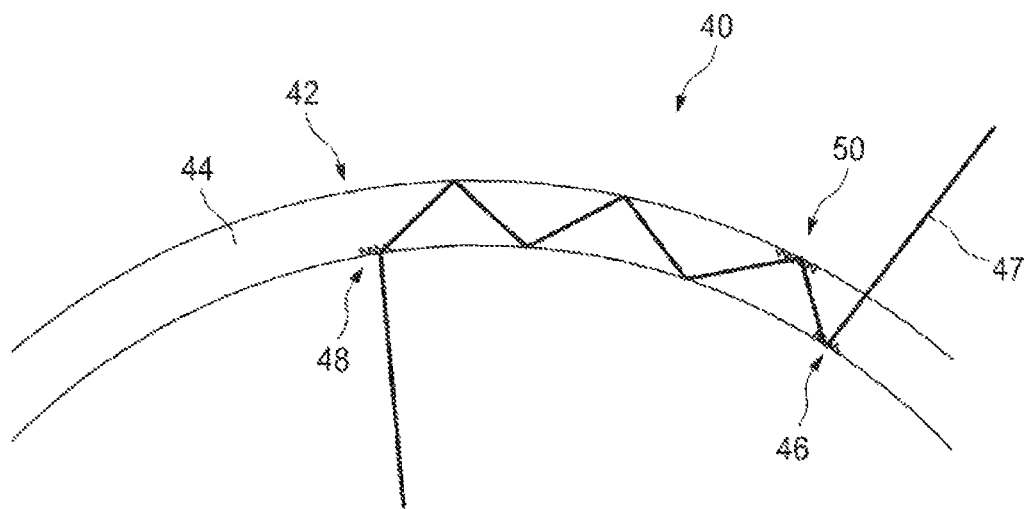
FIGS. 12A-E show still further exemplary embodiments of an optical system according to the disclosure in accordance with a further aspect.

In a first example in accordance with FIG. 12A of a correction arrangement 50 designed only in sections, the correction arrangement 50 compensates for the cumulative wavefront aberrations that arise at the also plurality of reflections in the curved optical waveguide 44. A further correction arrangement 50 designed only in sections is shown in FIG. 12C. Here it is possible, for example, to design the correction grating 50a for chromatic correction and the correction grating 50 for geometric correction of the wavefront.

Figure 12B:
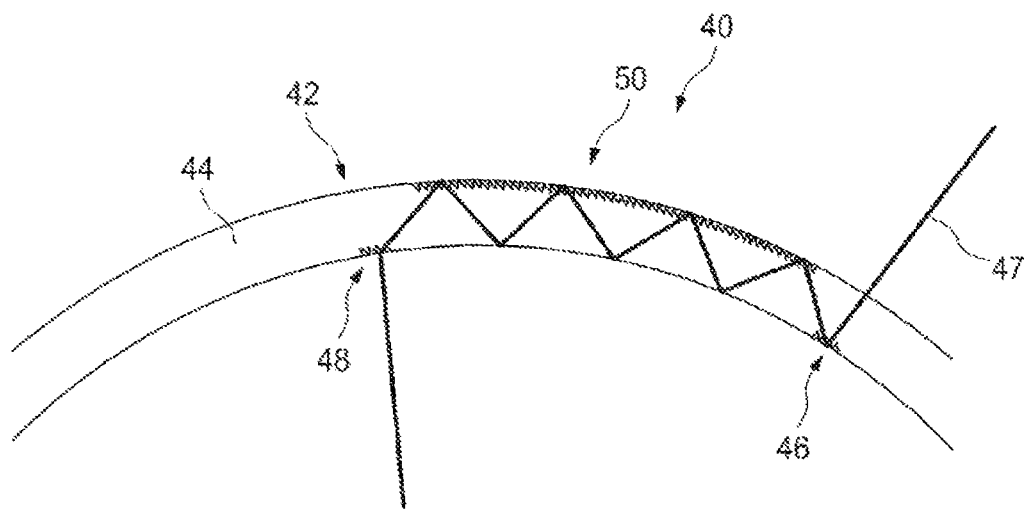
Figure 12C:
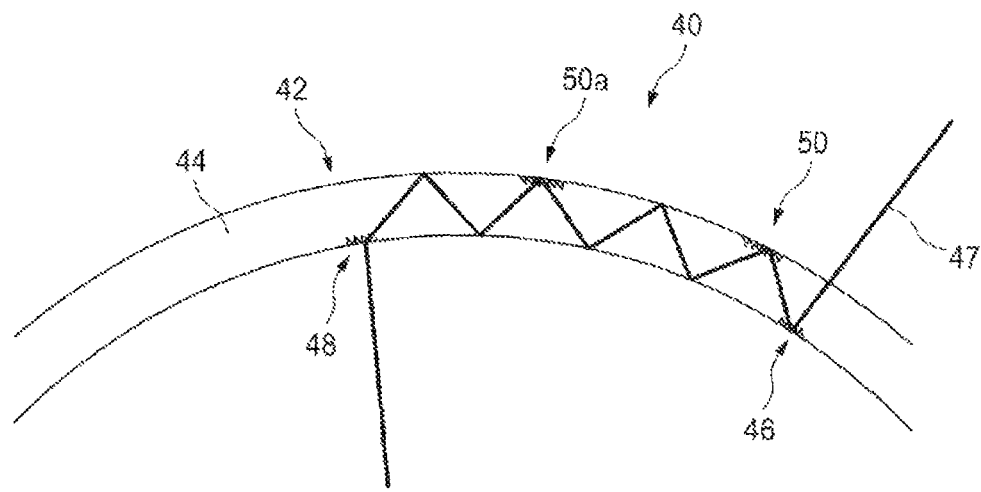
Figure 12D:
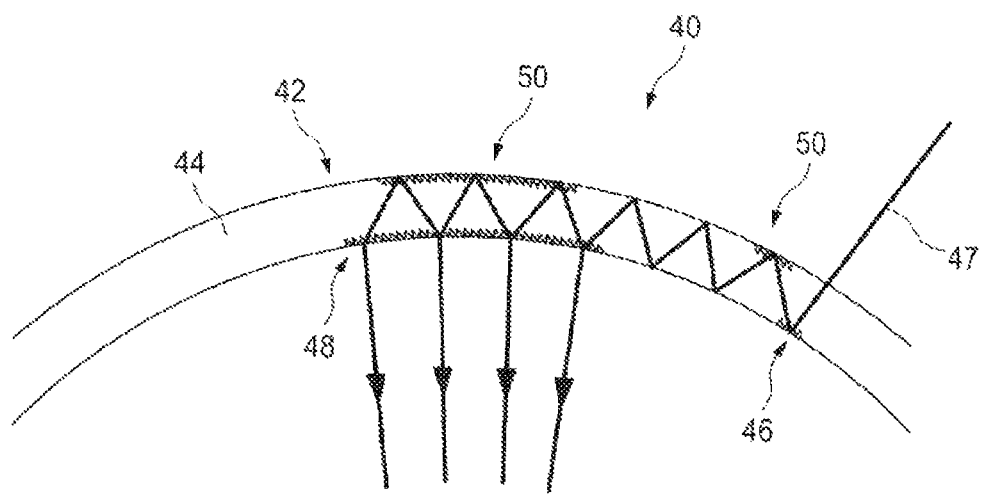
Figure 12E:
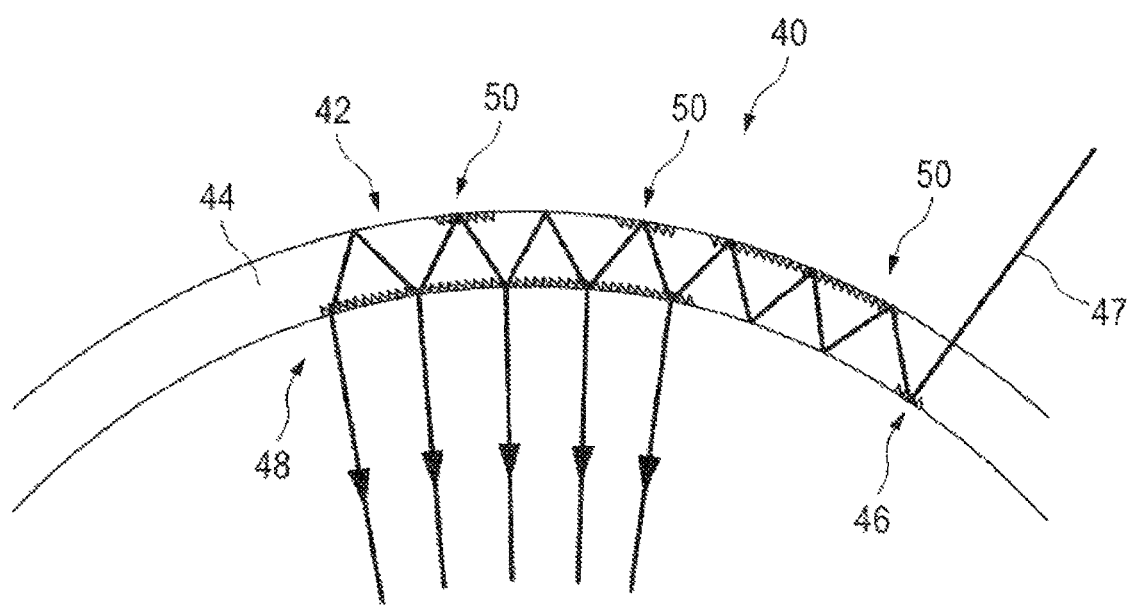

In a further example in accordance with FIG. 12B, the correction arrangement 50 is embodied over the entire area of the curved optical waveguide 44. This enables a piecewise compensation of the wavefront aberrations generated in the curved optical waveguide 44, for example of the wavefront aberration generated by the respectively directly preceding or directly succeeding reflection in the curved optical waveguide. In particular, the correction arrangement 50 thus corrects aberrations that arise on account of the curved optical waveguide from one output coupling location to the next (in this respect, also see the examples in FIGS. 12D and E, in which a plurality of light rays coupled out are shown). Thus, within a region in which light is coupled out via a plurality of output coupling locations, a complete correction of the imaging beam path is ensured and a corrected image of the source image is offered to the observer at each output coupling location. FIGS. 12D and 12E show examples of a correction arrangement 50 extending at least in sections also over the output coupling region 48.

The correction arrangement 50 can be designed either for the inner surface (in relation to the radius of curvature) or for the outer surface or for both surfaces of the curved optical waveguide. The effect of the curved optical waveguide on wavefront aberrations and possibly induced chromatic aberrations can be corrected in the same grating or in a second grating of the correction arrangement.

On account of the correction element 50, the input coupling arrangement 46 and the output coupling arrangement 48 can advantageously be calculated as for a planar optical waveguide arrangement such as is shown in the previous exemplary embodiments.

The above-described aspect of the present disclosure can be provided in the exemplary embodiments in accordance with FIGS. 9 to 11, such that the optical waveguide arrangements 15 and 15', respectively, can also be curved.

However, the present aspect can also be used independently of the aspects described in connection with FIGS. 9 to 11, in particular also in the case where the input coupling arrangements 46 and 48 are not diffractive, but rather only refractive or reflective input coupling arrangements without a diffraction effect.

Further aspects and exemplary embodiments of optical systems for transmitting a source image are described below with reference to FIGS. 13 to 30. Insofar as the spatial assignments "top", "bottom", "lateral", "left", "right" are used hereinafter, these terms have been chosen merely for reasons of simpler understanding. These spatial terms relate to the case where an optical system for transmitting a source image is worn by a user on the head, for example in the manner of glasses.

A limitation of an achievable field of view or field angle of 20°, for example, is mentioned in each case in the above description of the disclosure. This limitation applies, as evident from the above description, in the direction in which the light is coupled into the optical waveguide arrangement and is guided along the optical waveguide arrangement. In this direction, the guidance of the light is subject to the conditions of total internal reflection, as has been described above. This direction is also referred to as the critical direction. It goes without saying that the field of view or the image field angle of the transmitted source image is limited only in the critical direction. In the other direction, perpendicular thereto, the image field angle can become larger.

Figure 13:
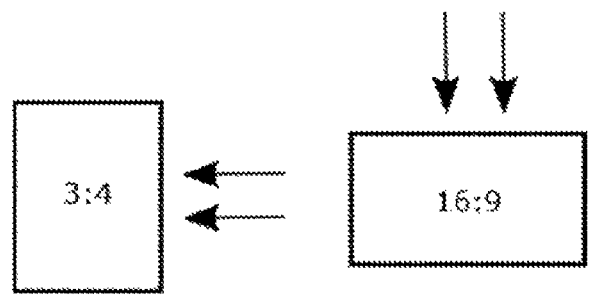
FIG. 13 shows a basic schematic diagram of two formats of transmitted or transmittable source images.

FIG. 13 shows achievable image fields in the portrait format "3:4" and in the landscape format "16:9" for different input coupling directions or critical directions, indicated by arrows.

For a representation in the portrait format with an aspect ratio of 3:4, upon input coupling from the right or left for typical materials of the optical waveguide arrangement the result is a maximum image field of approximately 20°×27° with a diagonal of 33°. In this case, the critical direction is the horizontal direction. For a representation in the landscape format with an aspect ratio of 16:9, upon input coupling from the top or bottom the result is a maximum image field or field of view of 36°×20° with a diagonal field of view of 41°. In this case, the critical direction is the vertical direction. The limit applies here in each case to optical waveguide arrangements including optical waveguides composed of polycarbonates having a refractive index of 1.588; fields of view that are larger approximately by 10° are achievable with episulfides such as PTU having refractive indices of up to 1.78. Larger fields of view or field angles are achievable by virtue of the principle according to the disclosure of combining a plurality of field angle ranges or subfields of the source image. In this regard, by way of example, approximately 60°×34° with a diagonal of 80° can be achieved in the landscape format with the vertical direction as the critical direction.

Figure 14:
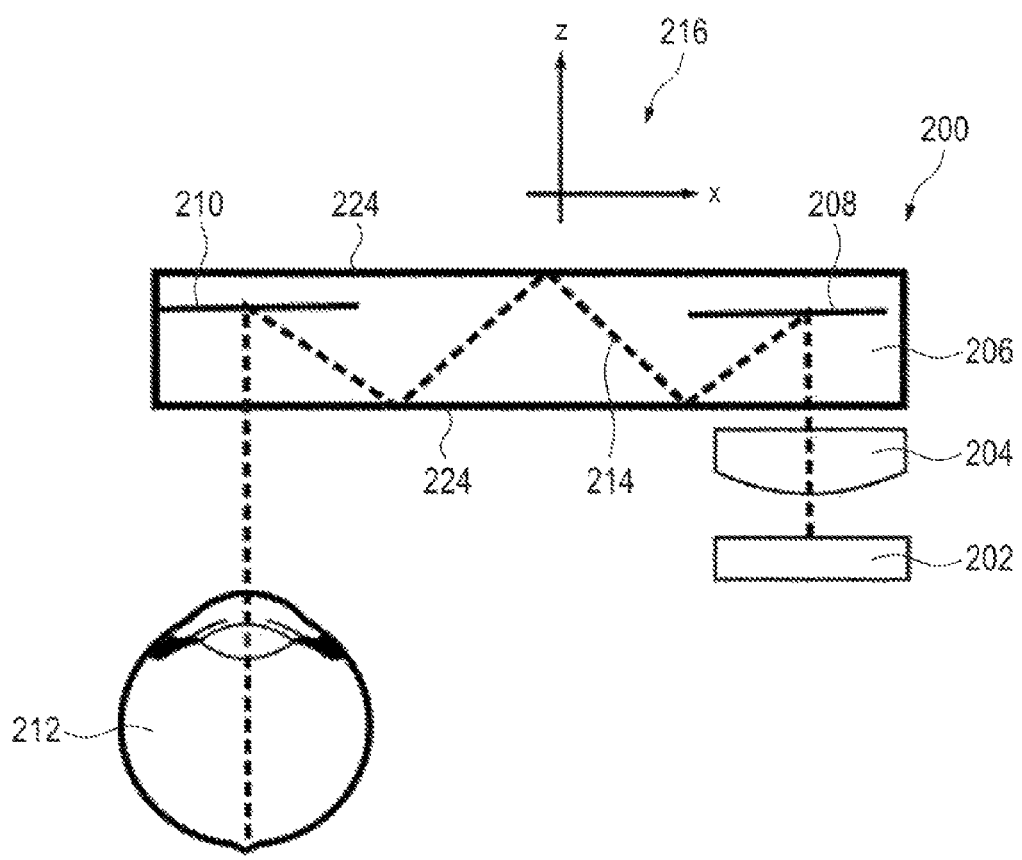
FIG. 14 shows a basic schematic diagram of an optical system for transmitting a source image.

FIG. 14 shows a basic schematic diagram of an optical system 200 for transmitting a source image in an arrangement for the right eye in the case of lateral horizontal input coupling of a source image. Light of a display or source image 202 is directed via an optical unit 204 onto an input coupling element 208 arranged in an optical waveguide 206, is guided via total internal reflection through the optical waveguide 206 and is coupled out into the user's right eye 212 via an output coupling element 210. The light emanating from the source image 202 right into the user's eye 212 is illustrated by an interrupted line 214. A coordinate system 216 in FIG. 14 indicates the direction of the x-axis and of the z-axis. The latter indicates the viewing direction of the eye. In accordance with the previous definition, the x-axis and the z-axis span a horizontal plane. FIG. 14 is thus a plan view of the system 200 from the top toward the bottom.

Figure 15:
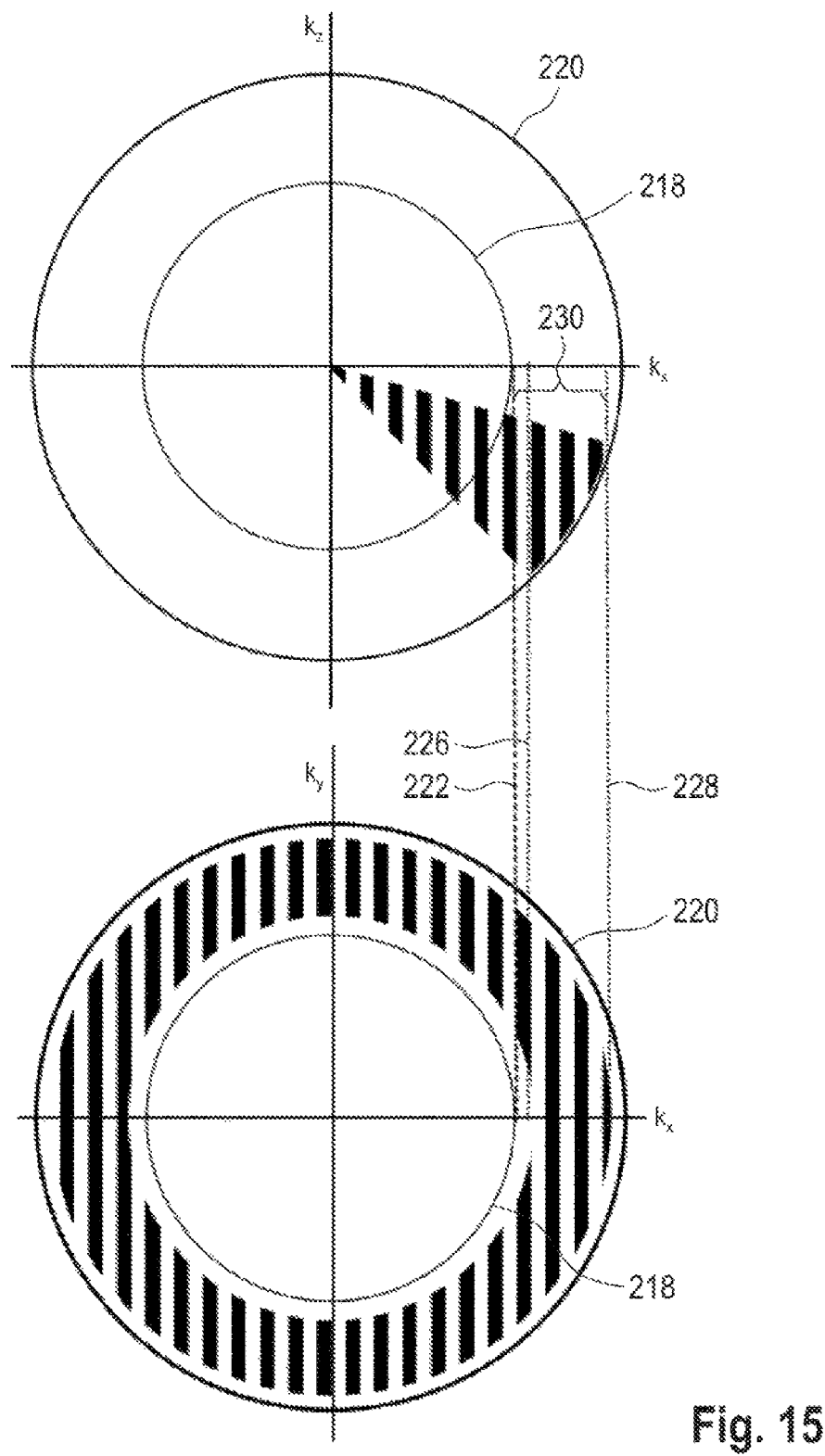
FIG. 15 shows two basic schematic diagrams of a field angle spectrum in k-space for illustrating transmittable field angle ranges of a source image.

FIG. 15 shows the field angles transmittable in the optical waveguide 206 in the spatial frequency domain or k-space. The indices "x" and "z" relate to the coordinate system 216 in FIG. 14. The following consideration applies to a wavelength λ. The upper partial figure in FIG. 15 shows a section through the Ewald spheres in the $k_z$-$k_x$-plane, and the lower partial figure in FIG. 15 shows a section through the Ewald spheres in the vertical $k_y$-$k_x$-plane.

The small circle 218 having the radius 2π/λ represents in each case a section through the Ewald sphere of the light outside the optical waveguide 206 having a refractive index of 1. The large circle 220 having the radius n2π/λ represents in each case a section through the Ewald sphere of the light within the optical waveguide 206 having a refractive index n. In order that the light is guided by total internal reflection in the optical waveguide 206, the x-component of the K-vector in the optical waveguide 206 is greater than 2π/λ. This critical angle is represented by a perpendicular dashed line 222. The guided angular spectrum of the light 214 then extends as far as a propagation angle parallel to the interface 224 (FIG. 14) of the optical waveguide 206. For practical reasons, for the guided light 214 a somewhat smaller angular range is chosen, for example as the smallest angle an angle that is greater than the critical angle of total internal reflection by 5°, and as the largest angle an angle that is less than the angle parallel to the interfaces by 15°, as has already been described above for example with reference to FIGS. 5 to 7. These two critical angles are represented by dotted lines 226, 228.

This results in an angular range in k-space which is guided in the optical waveguide 206 and which is restricted in the critical direction (horizontal) to an angular range that is illustrated with hatched lines and provided with the reference sign 230 in the upper partial figure in FIG. 15. In the non-critical direction (x-y-plane, lower partial figure in FIG. 15) there are no restrictions since the light is guided by total internal reflection in every direction in the optical waveguide 206.

The angular spectrum guided in the angular range 230 through the optical waveguide 206 can then be diffracted out of the optical waveguide 206 through a suitable output coupling element 210, for example in the form of a linear grating, and be fed to the observer's eye 212. This is illustrated in the further figures to be described below.

Figure 16:
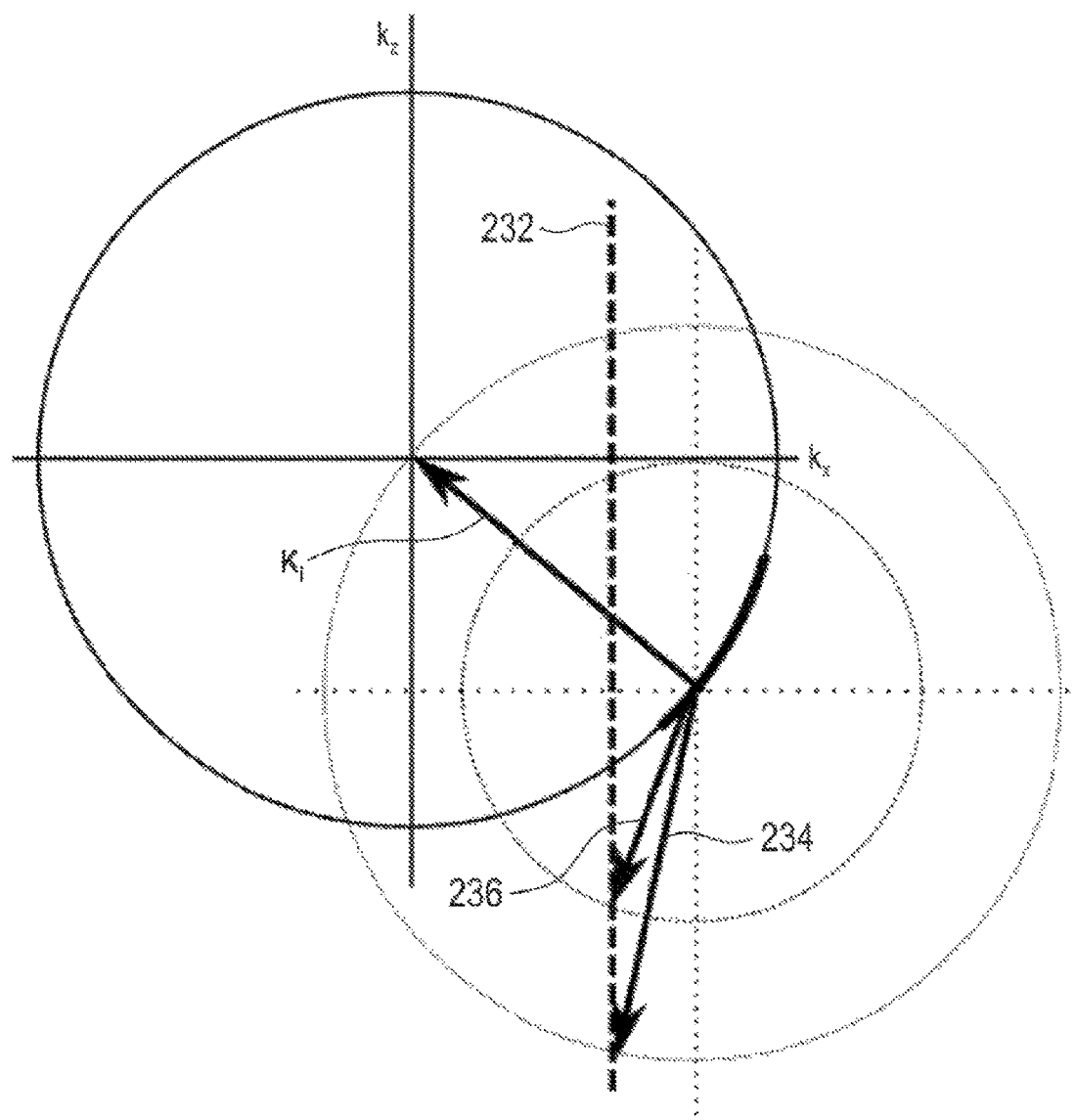
FIG. 16 shows a further basic schematic diagram for elucidating the relationships of transmitted field angles in k-space.

Firstly, FIG. 16 shows a wave vector $K_i$, incident on the output coupling element 210 in the form of an output coupling grating. For the diffraction at the grating, the Laue equation is satisfied:

$$K_s - K_i = G$$

The wave vector $K_s$ diffracted at the grating is therefore permitted to differ from the incident wave vector $K_i$ only by a grating vector G. For the case where the output coupling element 210 is a monofrequency linear grating lying parallel to the surface 224 of the optical waveguide 206, the possible grating vectors respectively for an order of diffraction of the output coupling grating lie on a perpendicular line 232. The diffracted wave vector $K_s$ (arrow 234), proceeding from the end of the incident wave vector $K_i$, ends on an intersection point of the Ewald sphere having the radius $n2\pi/\lambda$ and the perpendicular line 232 of the possible grating vectors. As a result of the refraction at the interface 224 of the optical waveguide 206, the transverse component of the wave vector does not change, such that the wave vector of the light outside the waveguide 206 proceeding from the end of the incident wave vector $K_t$ ends on an intersection point of the Ewald sphere having the radius $2\pi/\lambda$ and the perpendicular line 232 of the possible grating vectors, as represented by an arrow 236. With this design in accordance with FIG. 16, it is possible, as explained below, to represent the field angle transmitted by an optical waveguide such as the optical waveguide 206 with an output coupling element 210 in the form of a linear grating.

Figure 17:
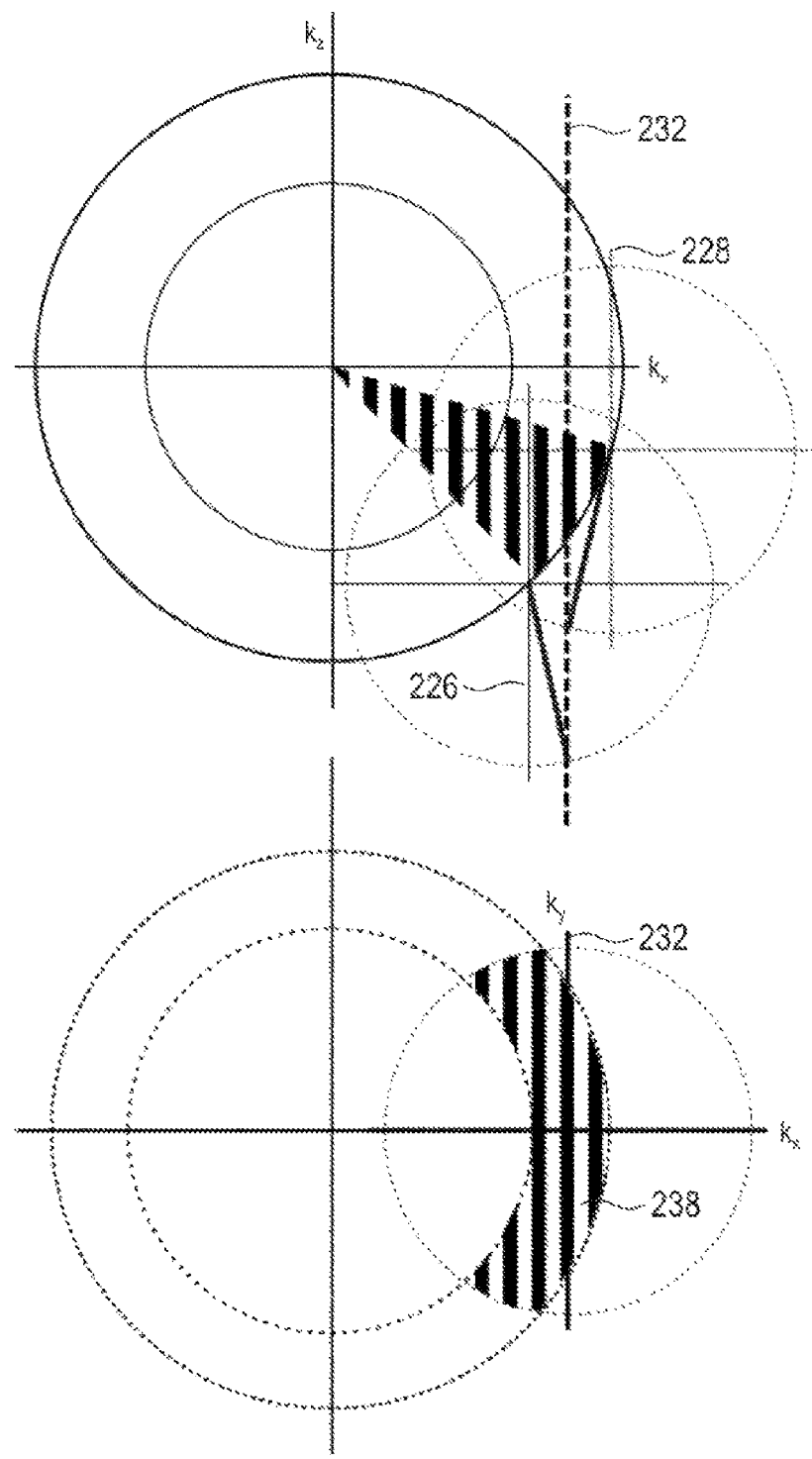
FIG. 17 shows further basic schematic diagrams for illustrating transmittable field angles in k-space.

In this respect, FIG. 17 shows the k-space representation as in FIG. 15, wherein the line 232 of the possible grating vectors and the lines 226 and 228 of the critical angles of the transmitted field angle range outside the optical waveguide 206 are additionally illustrated. The lower partial figure of FIG. 17 illustrates the transmitted field angle range on the basis of the k-space representation in projection. The transmitted field angle range results from the overlap of the projection of the Ewald sphere having the radius $2\pi/\lambda$, which is centered around the grating frequency line 232, and the angular range guided in the optical waveguide 206 from FIG. 15. The field angle range is thus arcuately delimited at each side (in the direction of the x-axis) and overall has a bent shape, as is shown by the hatched region in the lower partial figure of FIG. 15. The hatched region represents the transmittable field angle range.

Figure 18:
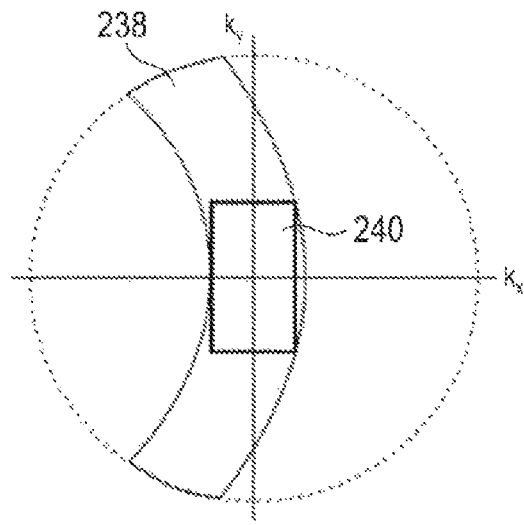
FIG. 18 shows a basic schematic diagram similar to the lower schematic diagram in FIG. 17 with a depicted source image.

FIG. 18 shows a rectangle 240 having an aspect ratio of 16:9 (portrait format), the rectangle being depicted in the transmittable arcuate field angle range 238. With the use of polycarbonate and the above-indicated angular distances relative to the respective critical angle, a rectangular field angle range having an aspect ratio of 16:9 is approximately 20°×35°, which corresponds to an image diagonal of approximately 40°.

The previous considerations related to a specific grating period or grating frequency of the output coupling grating 210 in FIG. 14. The transmittable field angle range can be altered via the design of the output coupling grating. This is shown in FIG. 19 for three different output coupling gratings having three different grating periods of respectively 60% of the waveguide λ, 78% of the wavelength λ and 107% of the wavelength λ (in vacuum), wherein instead of the one optical waveguide 206 in FIG. 14 three optical waveguides are present, which are arranged one behind another in the direction of the z-axis (as shown for example in FIG. 22), wherein one of the output coupling gratings mentioned above is assigned to each of the optical waveguides.

Figure 19:
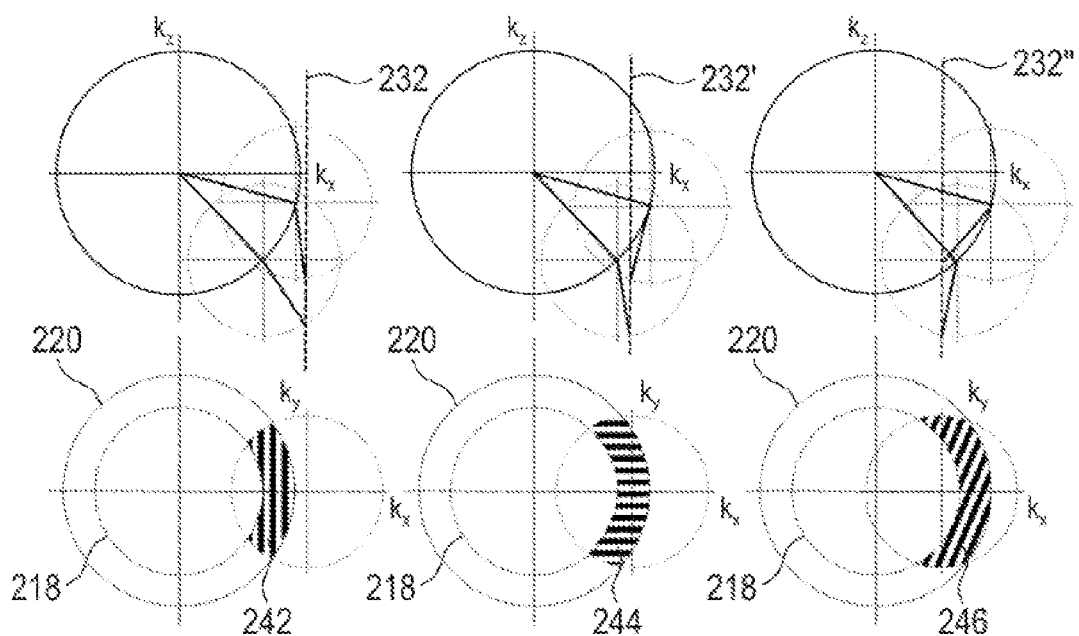
FIG. 19 shows six basic schematic diagrams corresponding to the basic schematic diagrams in FIG. 17 for three optical waveguides arranged one behind another in the viewing direction of an observer and having three different grating periods of a respective output coupling grating.
Figure 22:
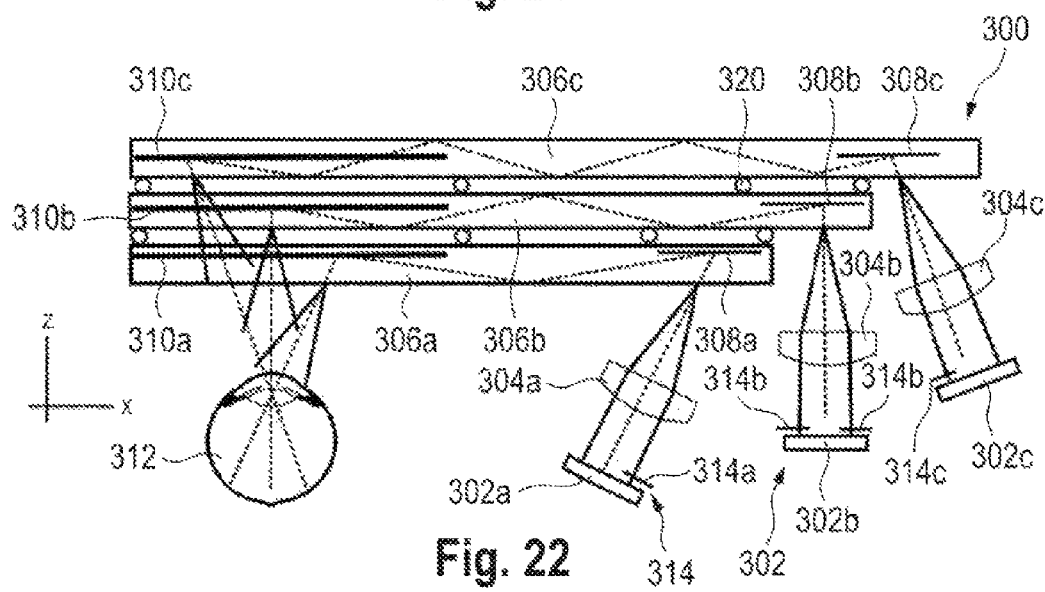
FIG. 22 shows a basic schematic diagram of an optical system for transmitting a source image including three optical waveguides, three input coupling elements and three output coupling elements.

FIG. 19 shows such an embodiment of triple multiplexing in the angle space, that is to say division of the source image into three subfields, upon input coupling of the subfields from the side (as shown in FIG. 14 for the non-split source image 202 or as shown in FIG. 22). In this case, FIG. 19 shows the example of an angle space diagram for the right eye as in FIG. 14. The upper row of partial figures in FIG. 19 shows the angle space consideration in a cross section relative to the respective optical waveguide, and the lower row illustrates an angle consideration in the viewing direction (z-axis), that is to say perpendicular to the respective optical waveguide or the optical waveguide arrangement. The circles 220 are in each case the projections of the Ewald spheres within (large circles having the radius $n2\pi/\lambda$) and the circles 218 outside (small circles having the radius $2\pi/\lambda$) the respective optical waveguide. The dashed perpendicular lines 232, 232' and 232" in the upper row of partial figures in FIG. 19 represent the frequency line of the respective output coupling grating. The input and output coupling directions respectively extend toward the right and left in FIG. 19. The example of output coupling via a respective output coupling grating in transmission is illustrated. The directions toward the top and bottom in the partial figures of the lower row in FIG. 19 are also referred to as the conic diffraction directions. The respectively transmitted different field angle ranges in the lower three partial figures result from the respective intersection lines of the critical angles in the respective optical waveguide and the small circles shifted by the grating frequency. The maximally transmittable field angle ranges become arcuate via the utilization of conic diffraction.

As is evident from the lower row of partial figures in FIG. 19, the transmittable field angle ranges for the three different grating periods of the respective output coupling gratings in k-space are laterally offset with respect to one another.

As already mentioned, the illustration in FIG. 19 corresponds to the illustration in FIG. 17 for three different, but slightly overlapping field ranges of a source image which are intended to be transmitted by optical waveguides arranged one behind another with three different grating periods of the respective output coupling grating of respectively 60% of the wavelength, 78% of the wavelength and 107% of the wavelength (in vacuum). For a wavelength of 550 nm, for example, grating periods of the respective output coupling grating of approximately 330 nm, 430 nm and 590 nm thus result.

Figure 20:
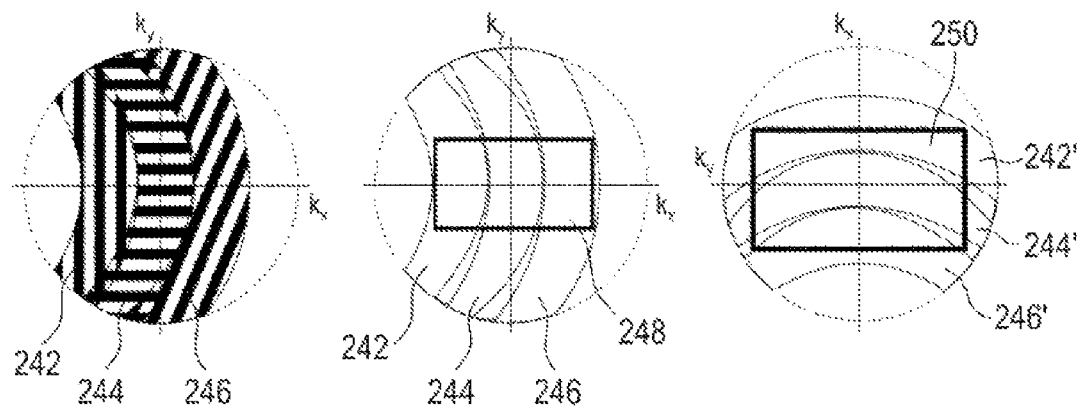
FIG. 20 shows three basic schematic diagrams of different, slightly overlapping subfields in accordance with the basic schematic diagrams in FIG. 19.

FIG. 20 shows, in the left partial figure, the three different, but slightly overlapping field ranges 242, 244 and 246, such as are perceived by the observer when they are joined together to form an overall image.

The middle partial figure in FIG. 20 depicts a rectangle 248 having an aspect ratio of 16:9, which represents an entire field angle range or an image field or field of view which can be transmitted upon input coupling of three subfields corresponding to the field angle ranges 242, 244, 246 of the source image from the side in a horizontal direction (as shown for example in FIG. 14 or 22). The total field angle range or the image which can be transmitted in the case of this arrangement has a size of 62°×35°, which corresponds to an image diagonal of approximately 71°.

The right partial figure in FIG. 20 shows with a rectangle 250 a total field angle range which is transmittable upon input coupling of three subfields corresponding to the field angle ranges 242', 244', 246' from the top or bottom, that is to say vertically and with an aspect ratio of 16:9. The illustration in the right partial figure in FIG. 20 is rotated by 90° for this. The total field angle range which can be transmitted in the case of this arrangement is 100°×56°, which corresponds to an image diagonal of approximately 115°.

Figure 21:
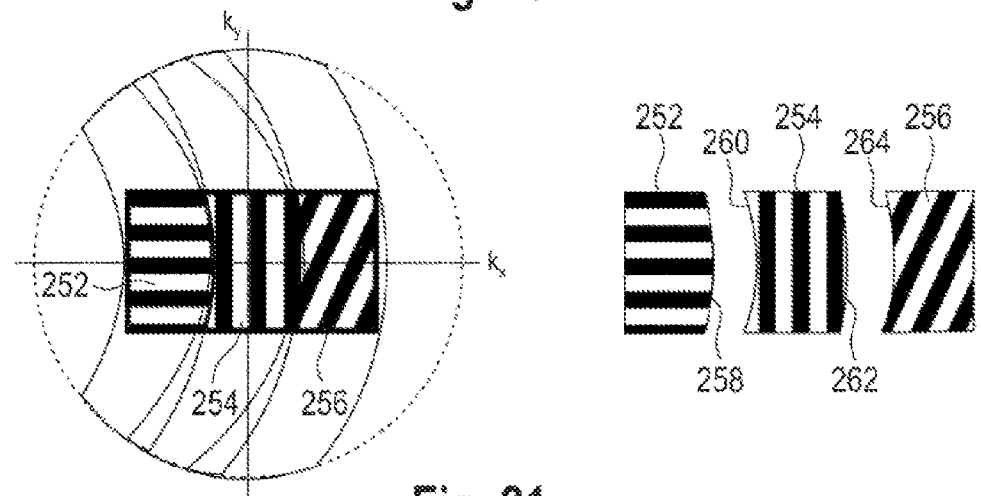
FIG. 21 shows two further basic schematic diagrams for illustrating arcuately bounded field angle ranges during the transmission of a source image.

Following these relationships, an optical system and a method according to the disclosure for transmitting a source image are based, then, on splitting the source image into at least two subfields, at least one of which is at least partly arcuately bounded before coupling into the optical waveguide arrangement. Specifically, as is evident from the explanations above, particularly large fields of view can be obtained if the field angle ranges are arcuately bounded at least at one side. This is illustrated schematically again in FIG. 21, for three field angle ranges 252, 254, 256 which, when strung together, yield a maximum field of view. Since the field angle ranges transmittable for each optical waveguide are arcuate, it is possible to achieve a larger total field angle range during the transmission if the individual transmittable ranges are fully utilized. This can be achieved according to the disclosure if the field angle ranges adjoining one another are designed to be arcuate at least at a boundary of the individual field angle ranges that is to be brought to overlap. The right partial figure in FIG. 21 illustrates in this respect the three field angle ranges 252, 254, 256 which together yield the total field angle range of 62°×35° implemented in the left partial figure of FIG. 21 or in the central partial figure of FIG. 20. Consequently, as shown in FIG. 21 in the right partial figure, for example, the source image can be split into three subfields, specifically the first subfield 252, the second subfield 254 and the third subfield 256, wherein a field edge 258 of the subfield 252 and a field edge 260 of the subfield 254 and also a further field edge 262 of the subfield 254 and a field edge 264 of the subfield 256 are configured in each case as concavely or convexly arcuate. As is evident from the right partial figure of FIG. 21, the radii of the arcuate field edges 258 to 264 are not identical, such that the subfields 252, 254 and 256 should partly overlap as shown in the left partial figure of FIG. 21. In this case, the field edges 258 and 260 are directly adjacent to one another, and so are the arcuate field edges 262 and 264.

It goes without saying that the principle of splitting the source image into at least two subfields, of which at least one and preferably both are arcuate on their field edges facing one another, can also be applied to the exemplary embodiments in accordance with FIGS. 9 and 10, and likewise to the exemplary embodiment in FIG. 11, wherein for the latter another variant will be described later.

FIG. 22 shows one exemplary embodiment of an optical system 300 for transmitting a source image 302, which likewise makes use of the above-described principle according to the disclosure.

The optical system 300 in FIG. 22 is shown in plan view from above.

The optical system 300 has three optical waveguides 306a, 306b and 306c, which are arranged one behind another in the direction of the z-axis (see coordinate system in FIG. 22). An input coupling element 308a and an output coupling element 310a are assigned to the optical waveguide 306a. An input coupling element 308b and an output coupling element 310b are assigned to the optical waveguide 306b. An input coupling element 308c and an output coupling element 310c are assigned to the optical waveguide 306c.

Each of the optical waveguides 306a to 306c transmits a subfield of the source image 302, that is to say a respective field angle range of the field angle spectrum of the source image 302, wherein the field angle ranges are at least partly different from one another, as is shown for example in FIG. 21.

FIG. 22 shows the eye 312 of an observer who, as a result of the transmitted subfields of the source image 302 being coupled out from the optical waveguides 306a, 306b, 306c, can perceive the complete source image 302 through combination of the three transmitted subfields. An angular range between approximately 45° and 75° of the guided light is in each case used in the optical waveguides 306a, 306b, 306c. The input coupling elements 308a, 308b, 308c and the output coupling elements 310a, 310b, 310c are embodied as diffraction gratings, wherein the grating periods of the input coupling elements 308a, 308b, 308c are mutually different, and the grating periods of the output coupling elements 310a, 310b, 310c are likewise mutually different. By contrast, the grating periods of the mutually associated output coupling elements and input coupling elements are identical. In the exemplary embodiment shown, the input coupling elements 308a, 308b, 308c and the output coupling elements 310a, 310b, 310c are embodied as buried diffraction gratings in the optical waveguides 306a, 306b, 306c.

Furthermore, optical units 304a, 304b and 304c are shown in FIG. 22. In this configuration, the source image 302 is provided three-fold, corresponding to three identical source images 302a, 302b and 302c. However, the full field angle range from each source image 302a, 302b, 302c is not coupled into the respective optical waveguide 306a, 306b, 306c, rather only a subfield that is arcuately bounded on one side or on both sides from each of the mutually identical source images 302a, 302b, 302c is coupled into the respective optical waveguide 306a, 306b, 306c. In other words, the source image 302 is split into three subfields having different field angle ranges. The optical system 300 correspondingly has a device 314 for splitting the rectangular source image 302 into three subfields. For this purpose, the device 314 has an optical arrangement including three field stops 314a, 314b and 314c, wherein the field stops 314a, 314b and 314c are arcuately bounded in a manner corresponding to the arcuate field edges 258, 260, 262, 264.

The field stop 314a is shown by way of example in FIG. 23B). The field stop 314a has an arcuate edge 316a, via which the subfield 252 having the arcuate field edge 258 is generated. The field stop 314b has an arcuate edge correspondingly on both sides in a manner corresponding to the field edges 260 and 262, and the field stop 314c has an arcuate edge, which serves for generating the subfield 256 having the arcuate field edge 264.

As an alternative to generating arcuately bounded field angle ranges via field stops, the division of the source image 302 into the subfields can also be realized electronically by the corresponding pixels of the respective source image 302a, 302b, 302c (in each case a display) that are not intended to be transmitted correspondingly not being driven or being driven such that they remain dark. In FIG. 23A), the region of the non-driven pixels is provided with the reference sign 317.

Referring to FIG. 22 again, it should be noted that the thickness of the optical waveguides 306a, 306b and 306c can be very small in principle, for example 200 μm. For practical reasons, a larger thickness may be advantageous, for example a thickness of 500 μm for each of the optical waveguides 306a, 306b, 306c. The optical waveguides 306a, 306b, 306c should be mounted at a distance with an air spacing of at least a few micrometers, for example 5 μm. This can be achieved via small spacers 320, which can be realized as small spheres or other structures on the optical waveguides 306a, 306b, 306c.

In this way, even in the case of triple field stitching (that is to say division of the source image into three subfields) in conjunction with triple color multiplexing, as was described with reference to FIG. 8, with then a total of nine optical waveguides, for example, relatively small thicknesses of less than 2 mm can be achieved. If the same optical waveguides in each case are used for the color multiplexing and the colors are separated in each case via the embedded gratings, the thickness decreases further to less than 2 mm.

If, as shown in FIG. 20, right partial figure, input coupling of the subfields of the source image 302 into the optical waveguides 306*a*, 306*b*, 306*c* from the top or from the bottom is realized, the transmittable total field angle range becomes even larger, as is evident from a comparison of the right partial figure in FIG. 20 with the central partial figure in FIG. 20.

If, by contrast, instead of arcuately bounded subfields, rectangularly delimited subfields are used, as shown in FIG. 24, then in the case of triple field stitching, that is to say division of the source image into three rectangular subfields, upon input coupling from the top in each optical waveguide 306*a*, 306*b*, 306*c*, only a field angle of a maximum of 80°×15° can be transmitted, and stringing together the three field angle ranges yields a resulting total field range of only 80°×45° with a diagonal of 92° by comparison with a field range of 100°×56° in the case of the use according to the disclosure of arcuately bounded subfields or field angle range segments. In the case of field stitching, it is therefore advantageous to transmit and string together arcuate subfields. It is thus possible to transmit source images with large field angles and thus a large field of view using fewer optical waveguides, for example only two or three optical waveguides.

Figure 25:
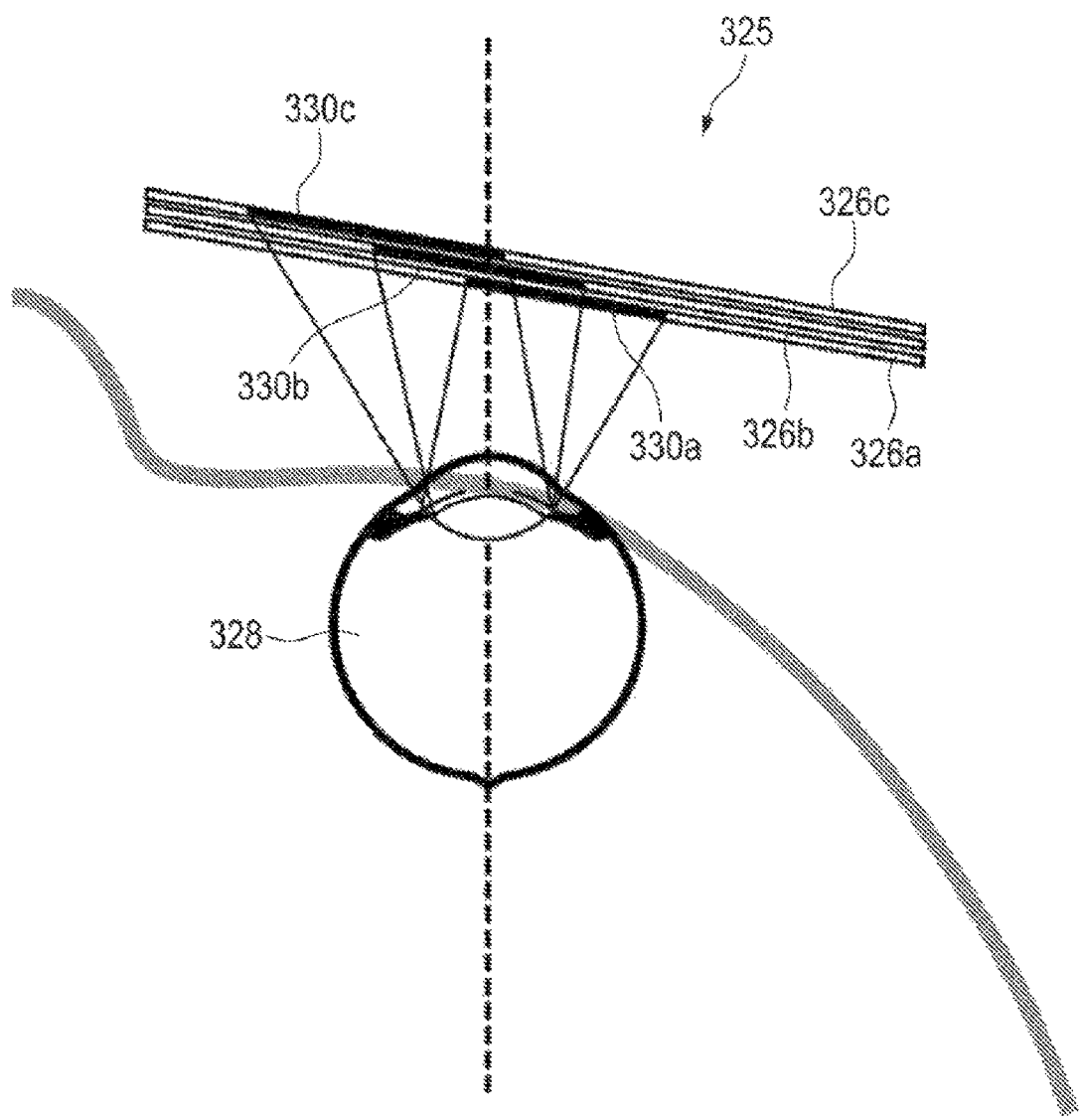
FIG. 25 shows a basic schematic diagram of an optical system for transmitting a source image in accordance with a further aspect.

FIG. 25 shows a further aspect of the disclosure. FIG. 25 shows three optical waveguides 326*a*, 326*b* and 326*c* arranged one behind another in the viewing direction and serving for transmitting three field angle segments of a source image that adjoin one another, as described with reference to FIG. 22. The input coupling optical unit is not illustrated in FIG. 25. The optical waveguides 326*a*, 326*b*, 326*c* illuminate the eyebox of the eye 328 of an observer, wherein the eyebox is the area that is swept over by the eye pupil rolling over the entire field angle. In the case of the optical system 325, three output coupling elements 330*a*, 330*b*, 330*c* are provided, each of which respectively is assigned to the respective optical waveguide 326*a*, 326*b*, 326*c*. In accordance with this aspect of the disclosure, the output coupling elements 330*a*, 330*b*, 330*c*, which can be configured as diffraction gratings, are arranged in a manner offset with respect to one another in such a way that only the eyebox in each case is illuminated for each optical waveguide 326*a*, 326*b*, 326*c* and the field angle segment or field angle range transmitted by the latter. The laterally delimited embodiment in an offset arrangement of the output coupling elements 330*a*, 330*b*, 330*c* thus achieves the effect that less light is lost.

For esthetic reasons, the optical waveguide arrangement including the optical waveguides 326*a*, 326*b*, 326*c* is furthermore arranged at an inclination in front of the eye 328, specifically by an angle of between 10° and 20°, for example. Moreover, it is possible (not shown) to incline the planar optical waveguide arrangement including the optical waveguides 326*a*, 326*b*, 326*c* in the other direction perpendicularly to the plane of the drawing by the so-called pantoscopic angle of between 10° and 20°. Larger angles of inclination in both directions are technically possible, but not preferable for esthetic reasons.

With more than three optical waveguides or materials having a relatively high refractive index such as, for example, PTU (polyurethane) or episulfides having refractive indices of up to 1.76, almost the complete half-space can be transmitted by way of arcuate angular ranges adjoining one another. Consequently, fields of view with a diagonal of more than 115° are also possible. According to the disclosure, here a field angle segment that is arcuately delimited in each case at at least one side can be transmitted in at least two channels, that is to say in at least two optical waveguides.

As described above, for transmitting large field angle ranges with three colors, for each field angle range and each color it is possible to use an optical waveguide with corresponding gratings. In the case of three field angle ranges or segments and three colors, an optical system according to the disclosure can therefore be realized with nine optical waveguides. Since the optical waveguides can be made thin, for example 200 µm thin, it is thus possible to realize a thin optical waveguide arrangement having a total thickness of 2 mm for optical systems worn on the head. However, the many interfaces, for example 18 in the case of 9 optical waveguides, lead to high reflection losses. Therefore, it is advantageous to antireflectively coat the optical waveguides with antireflection layers for the light passing through. The desired properties of antireflection layers can be reduced if, for each field angle range, the gratings for the three color ranges are embedded into one optical waveguide. The number of optical waveguides thus decreases to three with only six interfaces. Here for color multiplexing the same optical waveguides are used in each case and the colors are separated in each case via different gratings having different grating periods for the different wavelengths. The number of interfaces decreases as a result, but nine gratings are used in the example explained.

For the polychromatic transmission, it is also possible to use an optical waveguide with a coupling grating for a first field angle range for a first color and a second field angle range for a second color. In this regard, in polycarbonate with a grating period of 430 nm—in each case in the critical coupling direction—at a wavelength of 445 nm a field angle range of 0° to +20° can be transmitted, and at a wavelength of 650 nm a field angle range of −20° to 0° can be transmitted. It is thus possible to reduce the number of used coupling gratings for a transmission of large field angles with three colors and to increase the transmission of the overall system. By way of example, it is possible to transmit a large spectral range using only four coupling gratings and four optical waveguides instead of nine coupling gratings in three optical waveguides.

A further embodiment of an optical system according to the disclosure is described with reference to the further figures.

Figure 26:
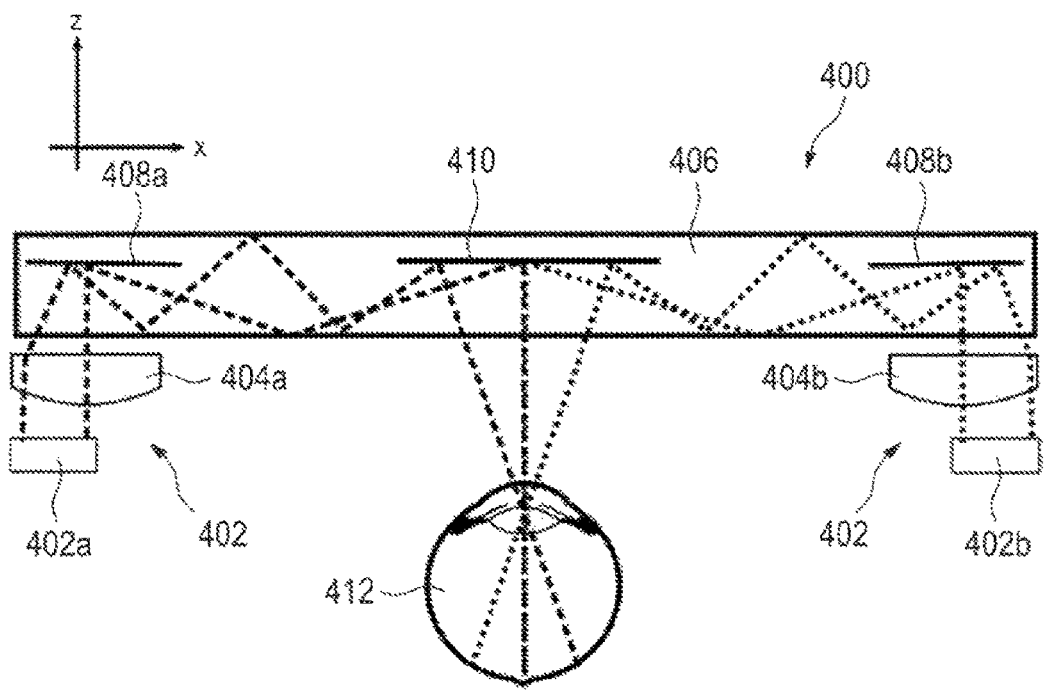
FIG. 26 shows a basic schematic diagram of a further optical system for transmitting a source image with end-side input coupling of the subfields of the source image.

FIG. 26 shows an optical system 400 for transmitting a source image, which is configured similarly to the optical system 10' in FIG. 11.

The system 400 serves for transmitting a source image 402 divided into two subfields 402*a* and 402*b* into an observer's eye 412. A respective optical unit 404*a* and 404*b* is assigned to the subfields 402*a* and 402*b*. The system 400 includes a single optical waveguide 406, into which the two subfields 402*a* and 402*b* are coupled from opposite sides of the optical waveguide 406, for example from top and bottom or left and right.

Respective input coupling elements 408*a* and 408*b* are assigned to the optical waveguide 406 correspondingly at opposite sides.

The construction of the system 400 is embodied symmetrically. For coupling out the two field angle ranges of the subfields 402*a*, 402*b*, here only one output coupling element 410 is used, that is to say that the output coupling element 410, for example in the form of a diffraction grating, serves for coupling out both transmitted subfields 402*a*, 402*b*, that is to say the associated field angle ranges of the source image 402 that are at least partly different from one another.

Figure 27:
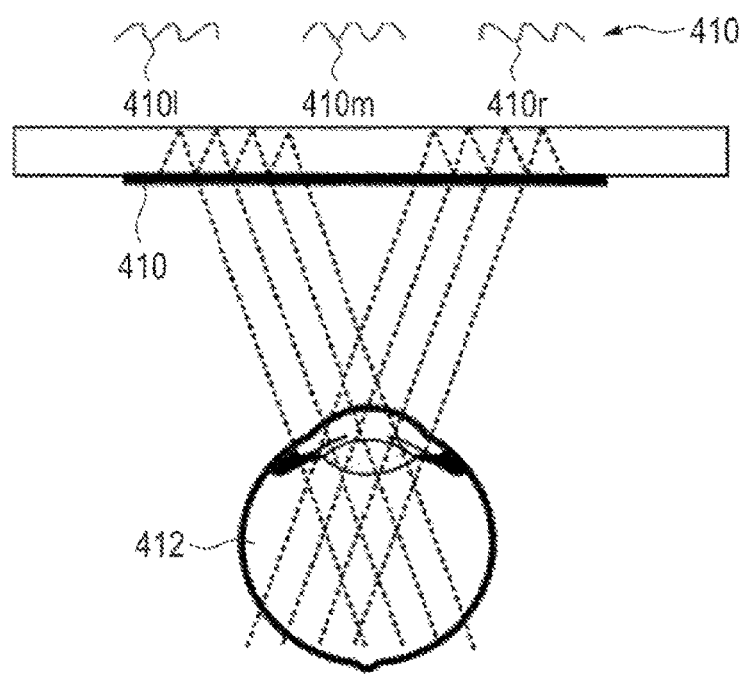
FIG. 27 shows a central segment of the optical system from FIG. 26 for illustrating a configuration possibility of an output coupling element of the optical system in FIG. 26.

In order to realize this, only one grating period is used for the output coupling in the case of the output coupling element 410, although the shape of the grating structures of the output coupling element 410 is variable over the extent thereof. In order to achieve homogenous output coupling of the light, it is advantageous, for the light coupled in from the left in FIG. 26, to cause the output coupling efficiency of the output coupling element 410 to increase from left to right and, for the light coupled in from the right in FIG. 26, to cause the output coupling efficiency of the output coupling element 410 to increase from right to left. This can be achieved as illustrated in FIG. 27 by the diffraction grating of the output coupling element 410 being designed as a symmetrical sinusoidal grating in a central region 410m, wherein the output coupling efficiencies for both input coupling directions (left and right) are identical in the region, while the output coupling element 410 assumes increasingly asymmetrical shapes of a diffraction grating on both sides of the central region 410m, which shapes increasingly assume the shape of a blazed grating. This is shown schematically in FIG. 27 for a region 410l and region 410r, both of which are arranged outside the central region 410m. FIG. 27 likewise shows schematically the fact that the direction of inclination of the increasingly blazed grating in the outer regions 410l and 410r is in opposite senses with respect to one another.

Figure 28:
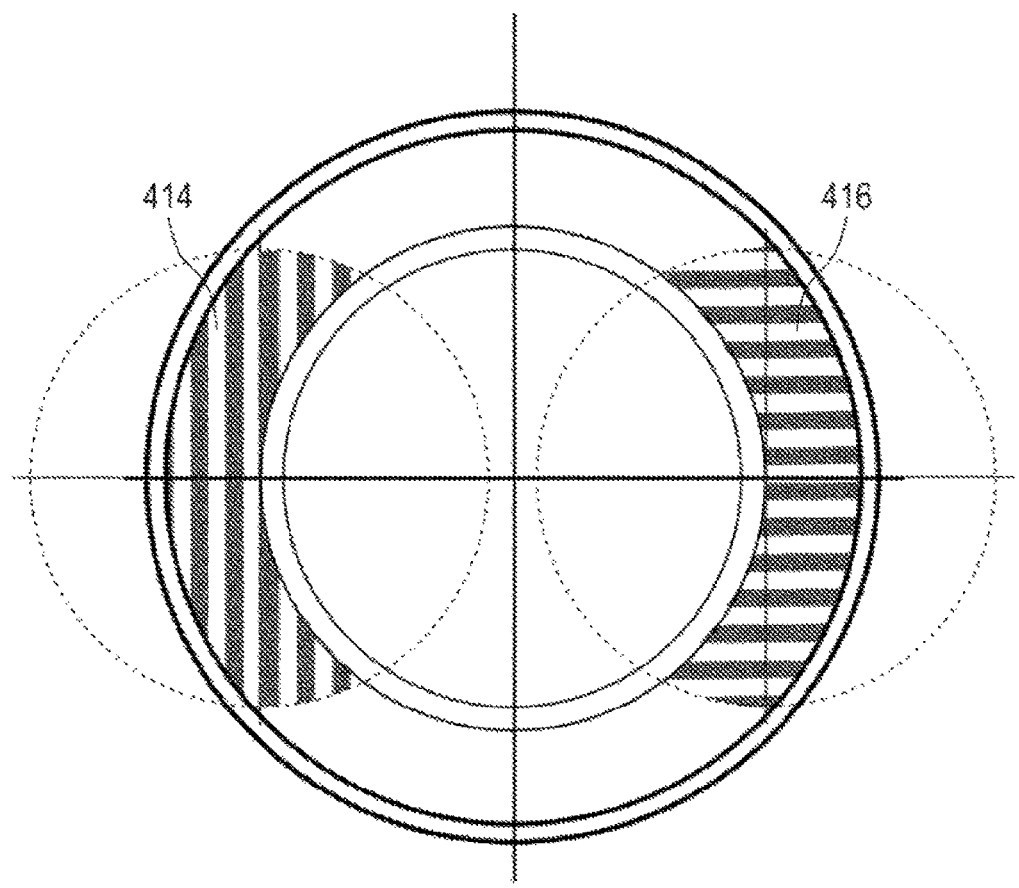
FIG. 28 shows a basic schematic diagram for illustrating the transmittable field angle ranges of the optical system in FIG. 26 in a representation in k-space.

FIG. 28 shows the two field angle ranges transmitted by the optical system 400 in a manner corresponding to the subfields 402a and 402b given a specific grating period of the output coupling element 410 of 498 nm and with polycarbonate as material of the optical waveguide 406 for a wavelength λ of 550 nm. The transmitted or transmittable field ranges are shown in a hatched manner and designated by the reference signs 414 and 416 in FIG. 28. The representation in k-space in accordance with FIG. 28 corresponds to a representation that is similar to FIG. 19, lower partial figures.

Figure 29:
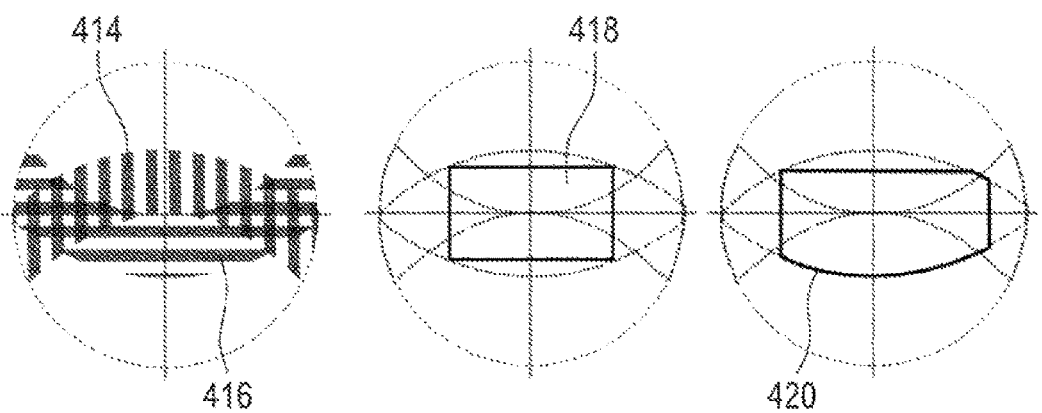
FIG. 29 shows three basic schematic diagrams of the stringing together of transmitted subfields in k-space in accordance with the transmittable field angle ranges in FIG. 28.

FIG. 29, left partial figure, illustrates the two combined field angle ranges 414 and 416 as a projection of k-space. A rectangular field 418 having an aspect ratio of 16:9 is depicted in the central partial figure of FIG. 29. A field angle or field of view of 65°×36° with a diagonal of 75° is thus achievable.

In accordance with the concept according to the disclosure, it is also possible to transmit a larger field angle range if the field angle ranges or at least one of the field angle ranges are or is at least partly arcuately bounded. This is illustrated on the basis of an example in the right partial figure in FIG. 29 for the right eye. Here, by way of example, the field angle range of the subfield 402b or the subfield 402b is bounded by an arcuate field edge 420 at its lower side. Here, accordingly, unlike in the previous exemplary embodiments, the arcuate boundary is not effected at the mutually facing field edges of the individual field angle ranges, but rather at an outer edge of at least one of the subfields.

The configuration in accordance with the right partial figure in FIG. 29 is desirable, for example, in order to magnify the field angle in the right half-space for the right eye.

At the same time, it is possible to magnify the field angle range for the augmentation of the lower hemisphere by an arcuate boundary of the transmitted field range. It goes without saying that further variants are conceivable, such as a further magnification of the field of view by an arcuate boundary of the upper hemisphere, that is to say of the subfield 402a.

Figure 30:
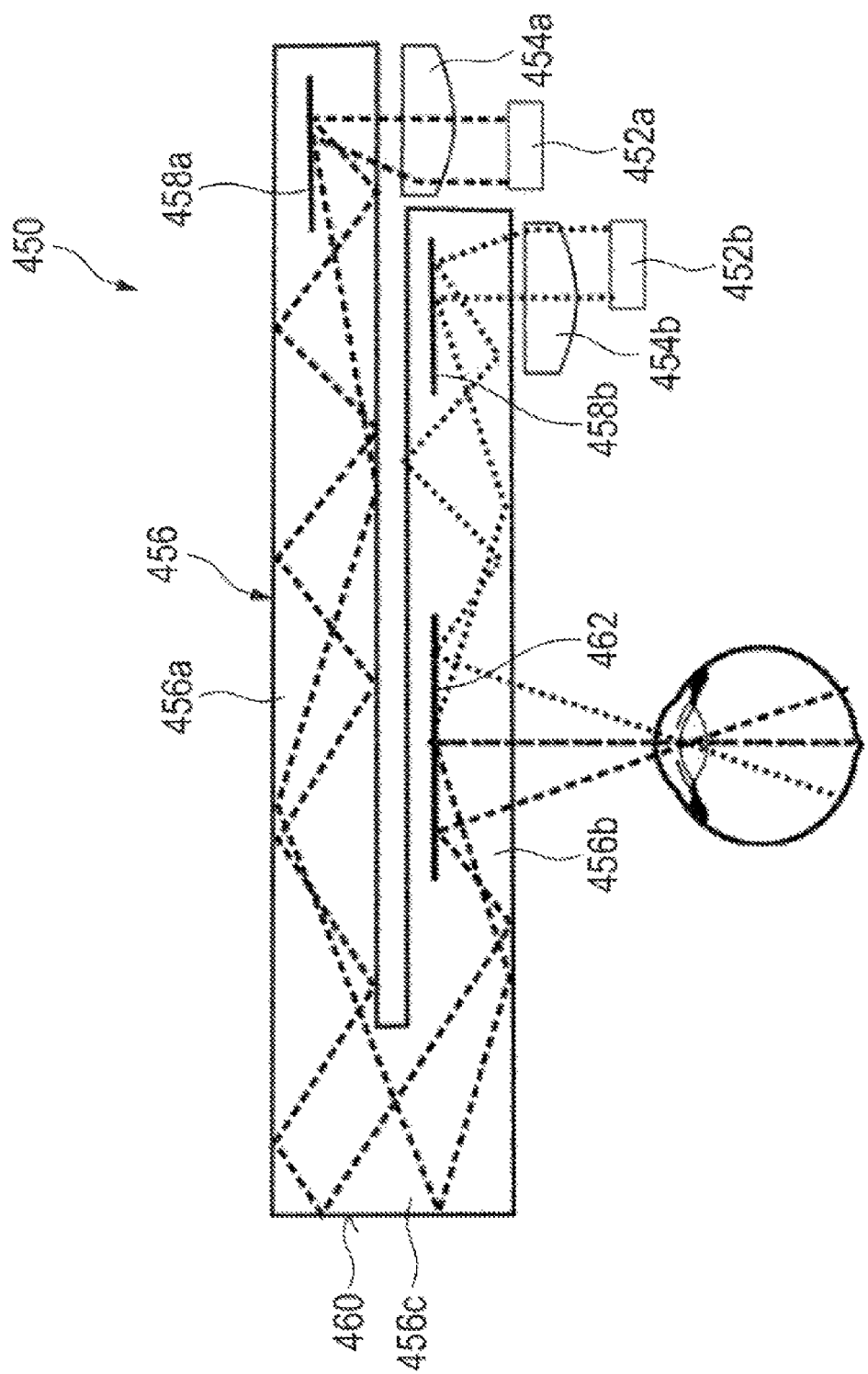
FIG. 30 shows a basic schematic diagram of a further optical system for transmitting a source image in accordance with a further aspect.

For the configuration with input coupling of the subfields from top and bottom or left and right, it is advantageous to place the input coupling on one side of the optical waveguide, as is shown in FIG. 30 for a modification of the optical system 400, this modification being provided with the reference sign 450. The optical system 450 in turn includes only one optical waveguide 456 having a first section 456a, a second section 456b and a third section 456c. The sections 456a and 456b run parallel to one another, while the section 456c preferably integrally interconnects the two sections 456a and 456b and runs perpendicularly to these two sections. The input coupling elements 458a and 458b are now arranged on the same side at the free ends of the first section 456a and of the second section 456b, respectively, of the optical waveguide 456.

The subfield 402a of the source image is coupled into the first section 456a of the optical waveguide 456 via the input coupling element 458a, wherein the light thus coupled in is guided via total internal reflection and in the third section 456c via a reflectively coated surface 460 or retroreflectors present there into the second section 456b, in which the light is coupled out by the common output coupling element 462 as in the case of the system 400 together with the other subfield 452b.

In this way, it is possible to achieve a large field angle range or a large field of view using only one diffractive output coupling element 462 per wavelength range and to increase the transmission of the optical system 450, wherein at the same time the input coupling elements 458a and 458b and the associated optical units 454a and 454b are arranged only on one side of the optical transmission system, here of the optical waveguide 456. In the case of color multiplexing using different output coupling elements for the three colors red, green and blue in only one optical waveguide, according to the disclosure it is thus possible to realize a transmission element in the form of an optical waveguide composed of polycarbonate with a large field angle range of up to 65°×36° using only one optical waveguide and three output coupling gratings in the transmission direction. Transmittable total field angle ranges of 90°×51° with a diagonal of 103° can be realized in episulfides or PTU having a refractive index of n=1.76.

What is claimed is:

1. An optical system configured to transmit a source image from which light having a field angle spectrum emanates, the optical system comprising:
    an optical waveguide arrangement in which the light can propagate by total internal reflection;
    an input coupling arrangement configured to couple the light emanating from the source image into the optical waveguide arrangement; and
    an output coupling arrangement configured to couple the light that has propagated in the optical waveguide arrangement out from the optical waveguide arrangement,
    wherein:
        the input coupling arrangement comprises:
            a first input coupling element configured to couple light from a first subfield of the source image into the optical waveguide arrangement; and
            a second input coupling element configured to couple light from a second subfield of the source image into the optical waveguide arrangement;
        the first subfield has field angles from a first field angle range of the field angle spectrum;
        the second subfield has field angles from a second field angle range of the field angle spectrum;
        the second subfield is at least partly different from the first subfield;

the second field angle range is at least partly different from the first field angle range;

the transmitted first and second subfields are at least partly superimposed on each other after coupling out from the optical waveguide arrangement; and the optical waveguide arrangement is curved.

2. The optical system of claim 1, wherein the optical waveguide arrangement comprises, between the input and output coupling arrangements, an optical correction arrangement configured to correct aberrations of a wavefront of the transmitted light.

3. The optical system of claim 2, wherein the optical correction arrangement comprises a diffractive optical correction arrangement.

4. The optical system of claim 2, wherein the optical correction arrangement is configured to correct geometric aberrations of the wavefront.

5. The optical system of claim 2, wherein the optical correction arrangement is configured to correct chromatic aberrations of the wavefront.

6. The optical system of claim 2, wherein the optical correction arrangement comprises a diffraction grating structure comprising at least one diffraction grating.

7. The optical system of claim 2, wherein the optical correction arrangement comprises a plurality of diffraction gratings distributed piecewise along the waveguide arrangement.

8. The optical system of claim 2, wherein:

the waveguide arrangement has a radial inner surface with respect to a curvature of the waveguide arrangement;

the waveguide arrangement has a radial outer surface with respect to the curvature of the waveguide arrangement; and the optical correction arrangement is arranged at at least one surface selected from the group consisting of the radial outer surface and the radial inner surface.

9. The system of claim 1, wherein at least one subfield selected from the group consisting of the first subfield and the second subfield is at least partly arcuately bounded before coupling into the optical waveguide arrangement.

10. The optical system of claim 9, wherein:

the first subfield has a first field edge;

the second subfield has a second field edge directly adjacent to the first field edge; and one of the following holds:

the first field edge is concavely arcuate and the second field edge is convexly arcuate; and the first field edge is convexly arcuate and the second field edge is concavely arcuate.

11. The optical system of claim 10, wherein the first and second subfields partially overlap in a region of the first and second field edges.

12. The optical system of claim 10, wherein:

the input coupling arrangement comprises a third input coupling element configured to couple in a third subfield of the source image;

the third subfield is arranged between the first and second subfields;

the third subfield has third field edges of which one is directly adjacent to the first field edge and the other is directly adjacent to the second field edge; and both third field edges are arcuate.

13. The optical system of claim 9, wherein at least one subfield selected from the group consisting of the first subfield and the second subfield is arcuately bounded at an outer field edge.

14. The optical system of claim 1, wherein the optical waveguide arrangement comprises:

a first optical waveguide configured to the propagate light in a first wavelength range; and a second optical waveguide configured to propagate light in a second wavelength range, wherein the second optical waveguide is separate from the first optical waveguide.

15. The optical system of claim 1, wherein the optical waveguide arrangement comprises:

a first optical waveguide into which the first input coupling element configured to couple the light from the first subfield; and a second optical waveguide into which the second input coupling element configured to couple the light from the second subfield.

16. The optical system of claim 1, wherein the input coupling arrangement comprises a transmissive optical diffraction grating structure.

17. The optical system of claim 1, wherein the input coupling arrangement comprises a reflective optical diffraction grating structure.

18. The optical system of claim 1, wherein the output coupling arrangement comprises a transmissive optical diffraction grating structure.

19. The optical system of claim 1, wherein the output coupling arrangement comprises a reflective optical diffraction grating structure.

20. The optical system of claim 1, further comprising a device configured to divide the source image into the first and second subfields.

* * * * *